US012717334B2

(12) United States Patent
Kinnaman

(10) Patent No.: US 12,717,334 B2
(45) Date of Patent: Aug. 25, 2026

(54) APPARATUSES, METHODS, AND SYSTEMS FOR SUPERVISING REMOTELY OPERATED VEHICLES OVER SPARSE DATALINKS

(71) Applicant: Greensea Systems, Inc., Richmond, VT (US)

(72) Inventor: Benjamin W. Kinnaman, Bolton, VT (US)

(73) Assignee: Greensea Systems, Inc., Richmond, VT (US)

( * ) Notice: Subject to any disclaimer, the term of this patent is extended or adjusted under 35 U.S.C. 154(b) by 242 days.

(21) Appl. No.: 18/517,687

(22) Filed: Nov. 22, 2023

(65) Prior Publication Data

US 2024/0345586 A1 Oct. 17, 2024

Related U.S. Application Data

(60) Provisional application No. 63/427,566, filed on Nov. 23, 2022.

(51) Int. Cl.

| | |
|---|---|
| ***G05D 1/221*** | (2024.01) |
| ***G05D 1/246*** | (2024.01) |
| *G05D 101/15* | (2024.01) |
| *G05D 111/10* | (2024.01) |
| *G05D 111/20* | (2024.01) |
| *G05D 111/30* | (2024.01) |

(52) U.S. Cl.

CPC ........... *G05D 1/221* (2024.01); *G05D 1/2462* (2024.01); *G05D 2101/15* (2024.01); *G05D 2111/10* (2024.01); *G05D 2111/20* (2024.01); *G05D 2111/32* (2024.01)

(58) Field of Classification Search

CPC .. G05D 1/221; G05D 1/2462; G05D 2101/15; G05D 2111/20; G05D 2111/32; G05D 2111/10

See application file for complete search history.

(56) References Cited

U.S. PATENT DOCUMENTS 8,989,876 B2 * 3/2015 Lenser .................... G06T 15/00 700/250
10,142,609 B2 * 11/2018 Wei ...................... H04N 13/167

(Continued)

*Primary Examiner* — Ramsey Refai

(74) *Attorney, Agent, or Firm* — Downs Rachlin Martin PLLC

(57) ABSTRACT

Apparatuses for operating a remotely operated vehicle (ROV) over a communications network that includes at least one sparse datalink that hampers remotely controlling the ROV in real time or near real time. In some embodiments, remote operation of the ROV is enabled by locating a local awareness/autonomy edge-processing node on the ROV side of the sparse datalink(s) and configuring the local awareness/autonomy edge-processing node to provide the ROV with local control based on remote supervisory commands received over the sparse datalink(s). In some embodiments, the local awareness/autonomy edge-processing node maintains situational awareness information regarding the environment local to the ROV that autonomy algorithms on the local awareness/autonomy edge-processing node use in controlling the ROV to perform one or more tasks within the need for real time or near real time remote control. Related methods, software, and systems are also disclosed.

30 Claims, 7 Drawing Sheets

(56) References Cited

U.S. PATENT DOCUMENTS

| | | | | |
|---|---|---|---|---|
| 11,776,250 | B2 * | 10/2023 | Park | G06T 7/136 382/103 |
| 12,012,189 | B2 * | 6/2024 | Parente Da Silva | G05B 13/0265 |
| 2011/0234796 | A1 * | 9/2011 | Taber | H04N 7/18 348/E9.057 |
| 2012/0019522 | A1 * | 1/2012 | Lawrence | G06T 17/00 345/419 |
| 2013/0012242 | A1 * | 1/2013 | Nag | H04W 4/185 455/457 |
| 2015/0192925 | A1 * | 7/2015 | Moles | G05D 1/0022 701/2 |
| 2016/0077599 | A1 * | 3/2016 | Knibbe | H05B 47/196 |
| 2017/0041587 | A1 * | 2/2017 | Wei | H04N 13/25 |
| 2017/0310936 | A1 * | 10/2017 | Nordin | G06F 3/1446 |
| 2017/0323154 | A1 * | 11/2017 | Kollmann | G06V 20/59 |
| 2021/0019521 | A1 * | 1/2021 | Park | G06N 3/092 |
| 2022/0145756 | A1 * | 5/2022 | Vagata | E21C 50/02 |
| 2024/0012412 | A1 * | 1/2024 | Du | G05D 1/005 |
| 2024/0300629 | A1 * | 9/2024 | Camilli | B63G 8/001 |

* cited by examiner 204
200
Local-Awareness Node
+
Robot
220
Status
208
228
228
216
224
224
Very limited Bandwidth Connection (Sparse Datalink)
212
Tasking

APPARATUSES, METHODS, AND SYSTEMS FOR SUPERVISING REMOTELY OPERATED VEHICLES OVER SPARSE DATALINKS

RELATED APPLICATION DATA

This application claims the benefit of priority of U.S. Provisional Patent Application Ser. No. 63/427,566, filed on Nov. 23, 2022, and titled "METHODS AND SYSTEMS FOR SUPERVISING REMOTELY OPERATED VEHICLES OVER SPARSE DATALINKS", which is incorporated by reference herein in its entirety.

FIELD OF THE DISCLOSURE

The present invention generally relates to the field of remotely operated vehicles. In particular, the present invention is directed to methods and systems for supervising remotely operated vehicles over sparse datalinks.

BACKGROUND

Remotely Operated Vehicles (ROVs) include underwater robots used for exploration, inspection, maintenance, repair, construction, and/or other complex tasks across the commercial, scientific, and defense industries. Operators control these robots by monitoring feedback from sensors mounted on the robots and issuing commands via manual or high-level digital inputs. To convey the data required for suitable control, ROVs are connected to computers on the water's surface via electrical or fiber optic tethers. Data transmission includes a downlink with operator commands and system parameters and an uplink that includes system data, sensor feedback, video, sonar, and other perception data. Using this data, operators make decisions and provide instructions to the ROV. This relationship distinctly defines the robot as "remotely operated" versus "autonomous" and is essential for performing complex tasks with robots underwater where human supervision and decision-making is required.

Hardwiring, a/k/a tethering, underwater robots to an operator control station, which is typically on the surface of the water, has several clear shortcomings. One of the most significant shortcomings is the requirement for the operator to be relatively closely located to the underwater robot, typically on a ship or platform from which the robot is deployed. This situational requirement limits the range and effectiveness of the robot and prohibits the robot's use in applications such as in high weather or military activities, where it would be dangerous for the human operator to be nearby.

Several solutions have been developed and employed to increase the separation between the human operator and the subsea robot. These solutions include acoustic modems to allow communication with the robot without the use of a cable through the water as well as remote operator terminals using the Internet allowing operators to interact with the surface control station from a very long distance.

All solutions developed to date are bespoke to individual robots, depend on high-bandwidth connections, and detrimentally impact the operation of the robot. The reduced bandwidth and increased latency in acoustic and Internet connections limit the amount of data that can be transmitted between the robot and an operator, which compromises the operator's situational awareness when operating the robot. Operators rely on the bandwidth-intensive data from the video cameras and other perception sensors, including imaging sonars, on the robot to successfully control the robot. With limited feedback data and/or feedback data that is delayed, operators are unable to make appropriate decisions and are unable to issue appropriate commands to effectively control the robots in complex tasks. Further, any command that is issued by the operator will be subject to the same bandwidth and latency constrictions existing in the remote communication link.

While solutions exist for remotely operating underwater robots without a physical connection, no solution exists for doing so without significantly compromising the effectiveness of the robot due to the imposed reduction of communications.

SUMMARY OF THE DISCLOSURE

In one implementation, the present disclosure is directed to a method of operating a remotely operated vehicle (ROV) to perform a task over a communications network containing at least one sparse datalink, wherein the communications network has a remote operator side and an ROV side. The method includes receiving, on the ROV side of the communications network, a remote supervisory command over the communications network from the remote operator side of the communications network, wherein the remote supervisory command is a command for the ROV to perform the task; receiving awareness data from the ROV; maintaining, on the ROV side of the communications network, awareness information based on the awareness data; and controlling, on the ROV side of the communications network, operations of the ROV as a function of the remote supervisory command and the awareness information so that the ROV performs the task.

In another implementation, the present disclosure is directed to a machine-readable storage medium containing machine-executable instructions for performing a method of operating a remotely operated vehicle (ROV) to perform a task over a communications network containing at least one sparse datalink, wherein the communications network has a remote operator side and an ROV side. The method includes receiving, on the ROV side of the communications network, a remote supervisory command over the communications network from the remote operator side of the communications network, wherein the remote supervisory command is a command for the ROV to perform the task; receiving awareness data from the ROV; maintaining, on the ROV side of the communications network, awareness information based on the awareness data; and controlling, on the ROV side of the communications network, operations of the ROV as a function of the remote supervisory command and the awareness information so that the ROV performs the task.

In yet another implementation, the present disclosure is directed to a local awareness/autonomy node for a remotely operated vehicle (ROV), wherein the local awareness/autonomy node allows a remote operator to operate the ROV to perform a task over a communications network containing at least one sparse datalink and having a remote operator side and an ROV side. The local awareness/autonomy node includes memory containing machine-executable instructions for performing a method of operating the ROV to perform the task over the communications network, the method including receiving, on the ROV side of the communications network, a remote supervisory command over the communications network from the remote operator side of the communications network, wherein the remote supervisory command is a command for the ROV to perform the task; receiving awareness data from the ROV; maintaining, on the ROV side of the communications network, awareness information based on the awareness data; and controlling, on the ROV side of the communications network, operations of the ROV as a function of the remote supervisory command and the awareness information so that the ROV performs the task; one or more communications ports configured to interface with systems aboard the ROV; one or more microprocessors: in operative communication with the memory; when the local awareness/autonomy node is deployed, in operative communication with the one or more communications ports; and configured to execute the machine-executable instructions so as to control the ROV to perform the task in response to the remote supervisory command.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

General

Figures 1, 2:
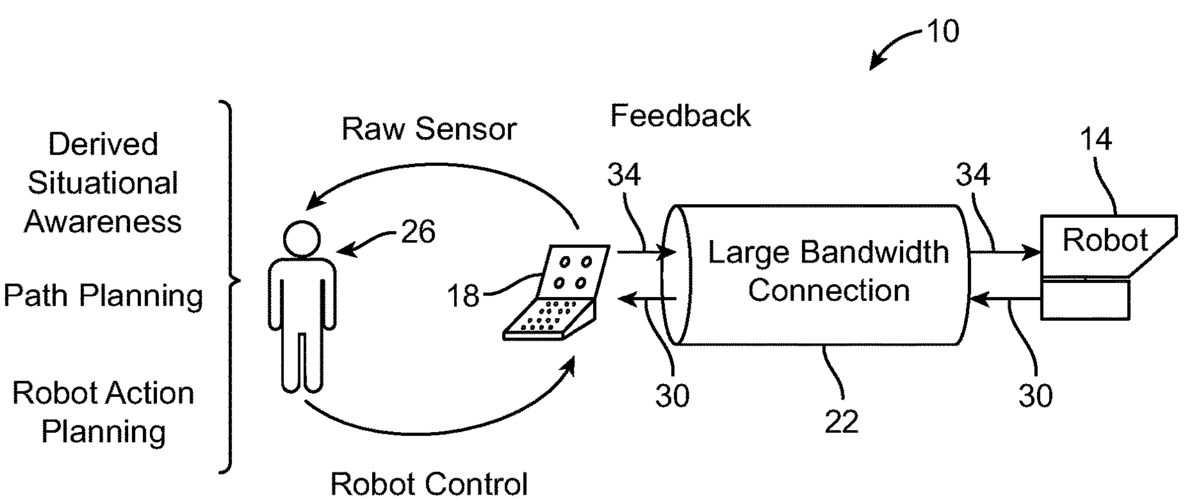
FIG. 1 is a high-level diagram illustrating operating principles of a conventional remotely controlled remotely operated vehicle (ROV) system.
FIG. 2 is a high-level diagram illustrating operating principles of an example remotely supervised ROV system of the present disclosure.

In some aspects, the present disclosure is directed to methods and remotely operated vehicle (ROV) systems that allow one or more operators to supervise an ROV effectively to carry out a desired mission despite the presence of a sparse datalink within the ROV system between the operator(s) and the ROV. In the context of the present disclosure, a "sparse datalink" is a data communications link, or series of data communications links, that has at least one of 1) a bandwidth that is narrower than the bandwidth needed for one or more remote supervisor to supervise the ROV so that it successfully performs a desired mission and 2) a latency that is higher than the maximum latency tolerable for being able to successfully perform a desired mission. Examples of datalinks that can be characterizable as a sparse datalink under contextual circumstances include, but are not limited to acoustic datalinks for underwater communications, cellular datalinks, and radio datalinks, among others. Regarding latency, in some cases multiple datalinks may be used in series to connect an operator to an ROV, wherein none of the datalinks individually exceeds the maximum tolerable latency. However, the cumulative latency of two or more of the multiple datalinks may exceed the maximum tolerable latency, making the series of datalinks a sparse datalink.

As discussed in the Background section above, having enough bandwidth in a datalink can become an issue, for example, when a remote operator is trying to control an ROV using one or more high-bandwidth imaging feeds, such as a video feed and/or a forward-looking sonar stream, among others. As also discussed in the Background section above, too long of a latency may become problematic, for example, when a remote operator sees images too long after the ROV captured them to send effective control commands to the ROV and/or when one or more control commands that a remote operator issues take(s) longer to reach the ROV than needed for the ROV to respond to the command effectively.

As explained and exemplified below in detail, apparatuses, systems, and methods of the present disclosure compensate for a sparse datalink by both reducing the amount of data that is carried by the sparse datalink and eliminating the need for real-time/near-real time operator control during a desired mission. Even though the ROV in an ROV system of the present disclosure is not necessarily operated remotely, one or more supervisors still issue commands. Consequently, in place of the term "remotely operated" the term "remotely supervised" is used to denote that one or more human operators still issue commands, but the commands are not real-time control commands. Rather, the issued commands can be augmented with local operating commands informed by local situational awareness learned locally to the ROV.

Consequently, and for the sake of convenience, the terms "remote control commands" and "remote supervisory commands", and like terms, as used herein and in the appended claims may be defined and distinguished according to the following definitions. "Remote control commands" are commands provided during a mission or task by an operator of a robot or machine from any distance that are low-level functional commands without any context of task, purpose, or desired end state. Remote control commands typically represent the lowest order of instructions required to initiate activity and are the output of higher-level planning, aggregation, and loop closure by the operator. Remote control commands are common and typical of most telepresence operations of machines and robots. Non-limiting examples of remote control commands include: "Run Thruster at 50%"; "Turn Right"; "Move Hand Forward". In contrast, "remote supervisory commands" are commands provided during a mission or task by an operator of a robot from any distance that are high-level objective-based instructions requiring context of task, purpose, and desired state. Supervisory commands often represent a partial or nonexistent understanding of situation awareness by the operator and require the robot's understanding of the work environment, ability to aggregate low-level functions, and potential to handle contingencies to execute. Supervisory commands require all loop closures to be done on an edge-computing node local to the robot. Non-limiting examples include: "Clean Starboard Side of Ship"; "Plug Connector into Socket Labeled 'Y2'"; "Return to Ship".

In some embodiments, apparatuses, systems, and methods of the present disclosure achieve their goals by providing both situational awareness and reactivity based on that awareness local to the ROV at issue. It is noted that in this context, "local to an ROV" means that the edge-computing, or "awareness/autonomy", hardware (e.g., processor(s), controllers, memories, data port(s), etc.) are part and/or proximate to the ROV at issue and downstream, relative to the remote operator(s), of any sparse datalink. For example, the awareness/autonomy hardware may be located onboard the ROV. Providing awareness/autonomy hardware onboard an ROV is particularly useful when the ROV is untethered and the data link includes a low-bandwidth acoustic data communications link. However, locating the awareness/autonomy hardware aboard the ROV may also be used in tethered-ROV situations. Example 1, below, describes an ROV system that has awareness/autonomy hardware located aboard the ROV. As another example, some or all of the awareness/autonomy hardware may be located offboard of the ROV. Providing awareness/autonomy hardware offboard of an ROV can be desirable when the ROV is tethered and the tethered connection is neither bandwidth nor latency constrained such that it does not contribute to a sparse datalink. In a tethered scenario, awareness/autonomy hardware may be provided at the head-end of the tether. Example 1, below, describes an ROV system that has awareness/autonomy hardware located offboard of the ROV.

In some embodiments, methods of the present disclosure can be particularly adapted to and useful for allowing ROV manufacturers to continue to use their ROV operating platforms without modification while deploying them in ROV systems having a sparse datalink. A variety of tethered-operation ROV platforms exist that do not have bandwidth constraints and latency issues because all data communication between the ROV and remote supervisor(s) occurs over a high-bandwidth low latency cable connection. By implementing methods of the present disclosure, the manufacturers can adapt their existing ROV platforms for use with sparse datalinks, either by implementing the methods in new ROVs or by retrofitting existing ROVs. In some embodiments, methods of the present disclosure can be constructed to be agnostic relative to ROV operating platforms and therefore configured in a plug-and-play format that users can easily deploy in either new ROVs that they build or in existing ROV systems that they retrofit. Example methods that employ platform agnostic techniques are described below.

In some aspects, the present disclosure is directed to systems for implementing one or more methods of the present disclosure and apparatuses in which one or more of such methods are implemented. In some embodiments, such a system may be a modular system that includes a local awareness/autonomy node. The local awareness/autonomy node is typically located onboard an ROV at issue or, in any event, at least downstream, in the direction of the ROV, of the sparse datalink. Regarding an example of the latter, the local awareness/autonomy node may be located offboard of the ROV, with the local awareness/autonomy node being operationally connected to the ROV via a non-sparse datalink, such as via a wired/cabled datalink.

The local awareness/autonomy node includes one or more processors, often, but not necessarily, at least two processors, and hardware memory that contains machine-executable instructions that provide any one or more of the following: 1) feature mapping and object classification; 2) self-situational-awareness-based ROV control algorithms for locally controlling the ROV as needed to maintain proper control of the ROV during a desired mission; and 3) interfaces between the local awareness/autonomy node and the ROV platform for obtaining ROV-generated data (e.g., video data, sonar data, and/or other sensor and instrumentation data) and for providing control commands to the ROV platform. In some embodiments, a local awareness/autonomy node can be embodied into a discrete device that mounts onto or within an ROV. In some embodiments, a local awareness/autonomy node can be embodied in a discrete device that is located remotely from the ROV but with a non-sparse datalink between the local awareness/autonomy node and the ROV. In some embodiments, a local awareness/autonomy node can be integrated directly within an electronics enclosure that is already part of an ROV, among other configurations. Example features of components of a local awareness/autonomy node of the present disclosure and the corresponding functionalities are provided below.

In some embodiments, a modular version of a system of the present disclosure may include a bridge-processing node and/or one or more bridge-terminus nodes (collectively, "bridge nodes"). Each bridge node may include one or more computer processors, memory for storing bridge-control software, and a networking switch for interconnecting two portions of an overall communications network of an ROV system. The bridge-control software may be configured to facilitate the union of two communication protocols and/or the terminus of a single communications protocol so that one or more supervisors may connect to the ROV system. Examples below illustrate various deployments of local-awareness, bridge-processing, and bridge-terminus nodes. However, other deployments are possible, as those skilled in the art will understand.

In some embodiments, a method of the present disclosure may be referred to herein as a "sparse-link compensation method" or the like, and a system of the present disclosure may be referred to herein as a "sparse-link compensation system" or the like.

Referring now to the accompanying drawings, FIGS. 1 and 2 are, respectively, diagrams of an example conventional remotely controlled ROV system 10 and an example remotely supervised ROV system 200 of the present disclosure that includes a sparse-datalink-compensation system of the present disclosure, illustrating primary differences between the two. As seen in FIG. 1, the conventional remotely controlled ROV system 10 has an ROV 14 and a human-operated control console 18 in data communications with the ROV over a large-bandwidth connection 22, such as a tethered connection. In the conventional remotely controlled ROV system 10, a human operator 26 can control the ROV 14 in substantially real time because the large-bandwidth connection 22 can pass raw sensor feeds (e.g., video and/or sonar; collectively illustrated at 30) to the control console 18 without undue delay, allowing the human operator to make instant decisions and input ROV-control commands 34 that the console and large-bandwidth connection provide to the ROV without undue delay. In the conventional remotely controlled ROV system 10, the human operator 26 is able to derive situational awareness and perform path planning and robot-action planning based on experience in determining which ROV-control commands 34 to issue to the ROV 14.

In contrast, in the example remotely supervised ROV system 200 of the present disclosure illustrated in FIG. 2, a sparse-datalink-compensation system 204, here, implemented in a local awareness/autonomy node, shifts some of the human-based tasks of the conventional remotely controlled ROV system 10 of FIG. 1 to the downstream side, i.e., the ROV side, of a sparse datalink 208. As discussed above, the sparse-datalink-compensation system 204 (also referred to herein as a "local-awareness/autonomy node") shifts some of the situational awareness, path planning, and/or robot-action planning to the ROV 212, which may or may not be identical to ROV 14 of FIG. 1, by automating these tasks and automatedly building one or more classified feature maps that underlie automated situational awareness, path planning, and robot-action control. With this shifting of tasks and automation, the remotely supervised ROV system 200 can perform any real-time control needed to keep a desired mission running smoothly without incident. Effectively, the ROV-side automation of critical task takes the bandwidth and/or latency of the data communications network, i.e., the sparse datalink 208, between a control console 216 and the ROV 212 out of the control equation. In this example, with the capabilities of the ROV 212 enhanced by the sparse-network-compensating system 204, the role of each human operator 220 in the remotely supervised ROV system 200 is changed to monitoring status 224 of the ROV 212 and higher-level, or supervisory, tasking 228 of the ROV, both of which have much lower communications bandwidth requirements than conventional full remote control of ROVs as in the remotely controlled ROV system 10 of FIG. 1.

EXAMPLES

This section describes some example scenarios that illustrate the usefulness of methods and systems of the present disclosure, as well as features that can be embodied into such methods and systems. Those skilled in the art will readily understand that these examples are provided for illustration and should not in any way be considered limiting. Indeed, skilled artisans can easily extract general principles from these examples and apply desired ones of the extracted principles to other scenarios using only routine skill in the art.

Example System Components

Figure 3:
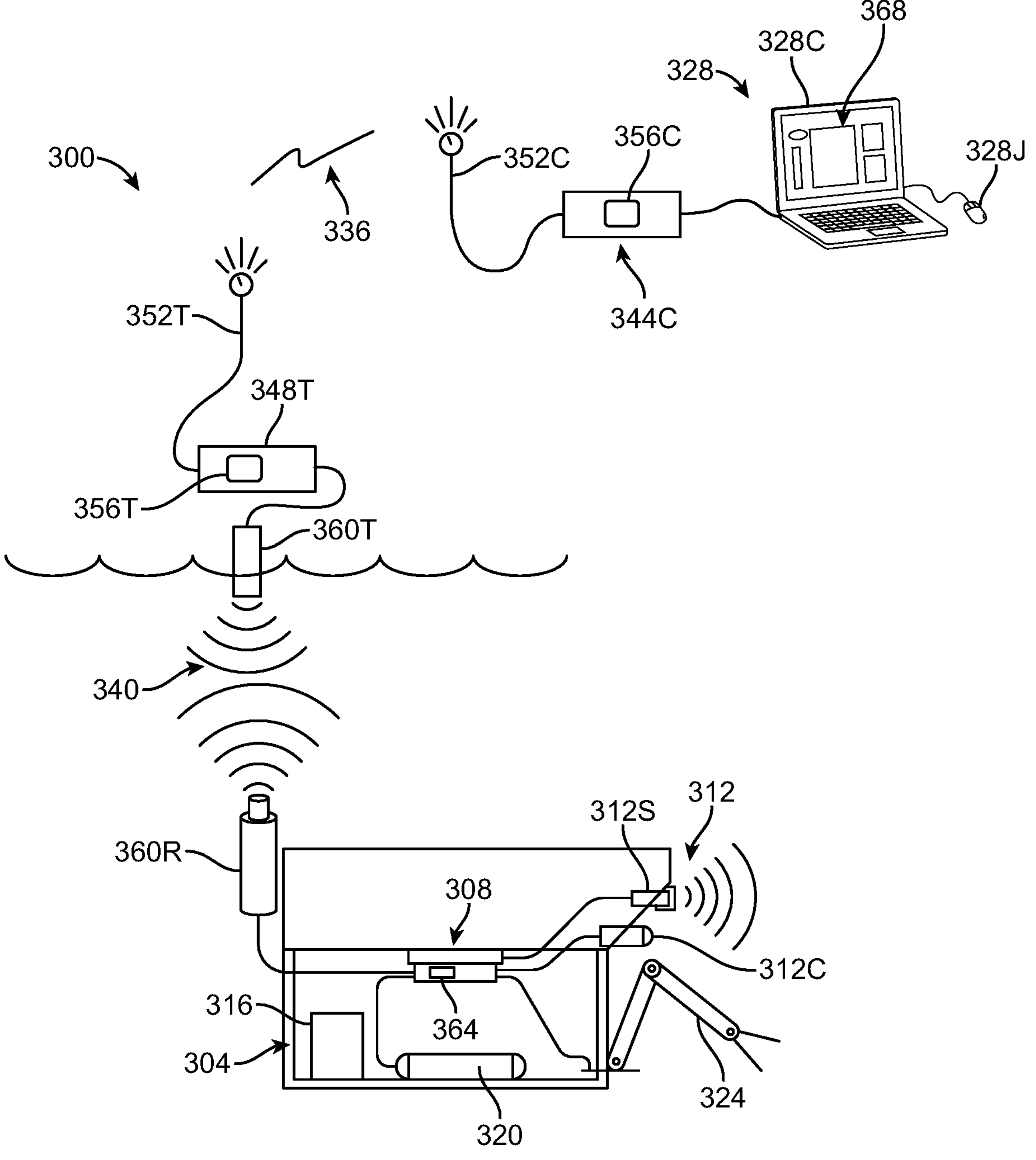
FIG. 3 is a schematic diagram of an example remotely supervised ROV system that includes a tetherless ROV, an ROV-supervisor station wiredly connected to a communications bridge/terminus, and sparse datalink comprising a line-of-sight (LoS) radio data link and an acoustic data link.

FIG. 3 illustrates an example remotely supervised ROV system 300 that includes an untethered underwater ROV 304 that includes an onboard local awareness/autonomy node 308. The ROV 304 may be of any suitable type and design, including conventional ROV types and designs, as long as it is outfitted with the necessary sensor(s) 312 and has an appropriate propulsion system 316 that is responsive to commands that the local awareness/autonomy node 308 issues. In this example, the ROV 304 includes two sensors 312, namely, and imaging sonar sensor 312S and a video camera 312C. However, those skilled in the art will understand that other sensors may be used and/or substituted for the example sensors 312 illustrated. The propulsion system 316 may be of any suitable type, for example, any conventional type, and will induce roll, pitch, and/or yaw motion and/or movement along a vector in any desired combination of directions, such as forward, rearward, sideways, upward, and downward. In addition to the sensor(s) 312, the ROV 304 in this example includes an ROV controller 320 and a tool/payload 324.

In this example, the ROV 304 is remotely supervised from a supervisory controller 328, which may be any suitable device(s), such as a laptop computer, a desktop computer, a custom device, alone or in combination with one or more suitable human-machine interfaces (HMIs). In this example, the supervisory controller 328 includes a computer 328C and a joystick device 328J as an HMI that allows a human user (not shown) to remotely supervise movement of the ROV 304. Also in this example, the supervisory controller 328 is in communication with the ROV 304 via two primary datalinks, here, a line-of-sight (LoS) radio datalink 336 and an acoustic datalink 340, which is a sparse datalink that does not allow a human user to remotely control the ROV 304 in real time or near real time. The LoS radio datalink 336 may or may not be a sparse datalink depending on its operating parameters. Regardless of whether the LoS radio datalink 336 is a sparse datalink or not, the human user can successfully remotely supervise the ROV 304.

The LoS radio datalink 336 is established in the example using a controller-side communications bridge/terminus 344C and a topside communications bridge 348T, each of which is in communication with a corresponding wireless radio transceiver 352C and 352T and runs corresponding bridge software 356C and 356T. The communications bridge/terminus 344C and the communications bridge 348T, as well as the wireless radio transceivers 352C and 352T, may comprise any suitable hardware, such as suitable hardware known in the field. The controller-side communications bridge/terminus 344C is in wired communication with the supervisory controller 328, and bridge software 356C aboard the controller-side communications bridge/terminus controls the communications between the supervisory controller and the wireless radio transceiver 352C. Those skilled in the art will readily know how to configure the bridge software 356C based on the parameters and protocols of the supervisory controller 328, the wireless radio transceiver 352C, and/or other components of the remotely supervised ROV system 300.

As mentioned, the ROV 304 is untethered. In this example, the ROV 304 is untethered via the acoustic datalink 340 that utilizes a ROV-side acoustic modem 360R and a topside acoustic modem 360T, each of which may be any suitable acoustic modem, such as any acoustic modem known in the field. The topside communications bridge 348T is in wired communication with the topside acoustic modem 360T, and bridge software 356T controls the communications between the wireless radio transceiver 352T and the topside acoustic modem 360T. Those skilled in the art will readily know how to configure the bridge software 356T based on the parameters and protocols of the topside acoustic modem 360T, the wireless radio transceiver 352C, and/or other components of the remotely supervised ROV system 300.

To enable sparse-datalink compensation within the remotely supervised ROV system 300, the local awareness/autonomy node 308 aboard the ROV 304 includes local awareness/autonomy software 364 and the supervisory controller 328 includes supervisory software 368, with the local awareness/autonomy software and the supervisory software having corresponding respective functionalities that drive the sparse-datalink compensation. For example, the local awareness/autonomy software 364 includes machine-executable instructions that may implement, among other things:

- sensor-interface algorithms for receiving, manipulating, storing, interpreting, etc., data from each sensor 312 aboard the ROV 304 and/or for controlling and/or otherwise interacting with each sensor;
- ROV-interface algorithms for interfacing with the ROV controller 320, for example to generate operating commands to send to the ROV controller and/or to receive feedback information (e.g., component and/or function status, etc.) from the ROV controller;

feature-mapping algorithms for mapping the environment surrounding the ROV as perceived by the sensor(s) aboard the ROV and conveyed in the sensor data;

object-classification algorithms for classifying objects in the environment surrounding the ROV based on the sensor data;

self-situational-awareness-based ROV control algorithms for locally controlling the ROV via the ROV-interface algorithms as needed to maintain proper control of the ROV during a desired mission;

supervisory-controller interface algorithms for interfacing with the supervisory controller 328, for example, to receive and/or interpret supervisory commands from the supervisory controller, provide the supervisory commands or interpreted versions of such commands to the self-situational-awareness-based ROV control algorithms, and/or provide ROV-generated data (e.g., video data, sonar data, and/or other sensor and/or instrumentation data).

In some embodiments, the local awareness/autonomy software 364, or one or more portions thereof, may be characterized as an autonomy engine that implements a suitable autonomy model, such as a behavior tree, a state machine, or other programmable finite process controlling method that operates upon the available awareness data and remote supervisory commands to provide the ROV 304 with the requisite autonomy needed to provide the sparse-datalink compensation needed to overcome the operational limitations imposed by the sparse datalink(s), here, the acoustic datalink 340 and possibly the LoS datalink 336.

The supervisory software 368 running in the supervisory controller 328 includes machine-executable instructions that may provide or implement, among other things:

a user interface (UI) that displays to a human user operational information, such as, sensor data from the sensor(s) onboard the ROV, mapping data, object-classification data, ROV-systems (e.g., from the propulsion system 316, an onboard navigation system, etc.) and receives inputs from the human user, such as supervisory-command inputs, targeting inputs, flight-path inputs, task-inputs, mission-level inputs, and/or other inputs needed to for the local awareness/autonomy node 308 to properly control the ROV 304 during deployment;

supervisory-command-generating algorithms that generate information, such as the supervisory commands handled by the supervisory-controller interface algorithms of the local awareness/autonomy software 364 aboard the local awareness/autonomy node.

Figure 4:
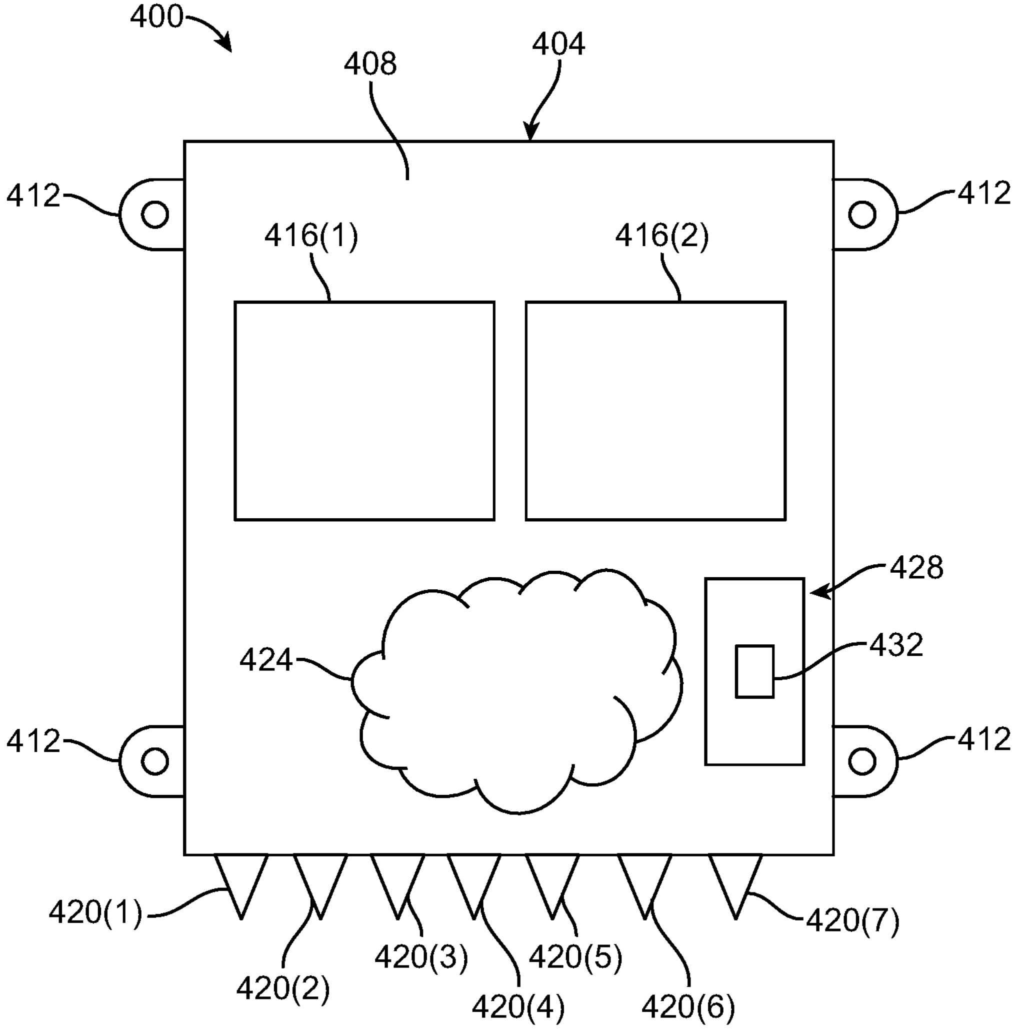
FIG. 4 is a diagram of an example local awareness/autonomy node designed and configured to be mounted aboard an ROV, such as the tetherless ROV of FIG. 3.

FIG. 4 illustrates an example local awareness/autonomy node 400 that can be used in a remotely supervised ROV system, such as for the local awareness/autonomy node 308 of the remotely supervised ROV system 300 of FIG. 3, among others. In the example illustrated in FIG. 4, the local awareness/autonomy node 400 is embodied as a module 404 that includes a waterproof enclosure 408 that is mountable to an ROV (not shown, but see the ROV 304 of FIG. 3), here via a set of mounting tabs 412 with which threaded fasteners (not shown) can be used to secure the module to the ROV in a suitable location.

In this example, the module 404 contains a pair of processors 416(1) and 416(2), one for each of the sensors (e.g., camera and sonar) that provide data that the local awareness/autonomy node 400 operates upon to provide functionalities that compensate for the sparse datalink(s) in the relevant remotely supervised ROV system, such as any of the remotely supervised ROV systems described herein or apparent to someone skilled in the art after reading this entire disclosure. Each processor 416(1) and 416(2) has all suitable components needed for the task at hand, such as a general processing unit (GPU), among others. In other embodiments, a different number of processors can be provided as needed to achieve the relevant functionalities in suitable amounts of time.

Also in this example, which is merely illustrative, the module 404 includes seven data ports 420(1) through 420(7), with: port 420(1) being a camera port for connecting to a camera (not shown, but see the camera 312C of FIG. 3) aboard the ROV; port 420(2) being a sonar port for connecting to a sonar (not shown, but see the sonar 312S of FIG. 3) aboard the ROV; port 420(3) being a navigation-system port for connecting to a navigation system (not shown) aboard the ROV; port 420(4) being an acoustic-modem port for connecting to an acoustic modem (not shown, but see the ROV-side acoustic modem 360 of FIG. 3), port 420(5) being an ROV-controller port for connecting to the ROV's controller (not shown, but see the ROV controller 320 of FIG. 3); port 420(6) being a tool/payload port for connecting to a tool and/or payload (not shown, but see tool/payload 324 of FIG. 3); and port 420(7) being a service/auxiliary port for connecting to a offboard computing device (now shown) for servicing (e.g., updating, configuring, troubleshooting, etc.) the module 404 and/or for connecting to another device or component aboard the ROV. Each of the ports 420(1) through 420(7) is a waterproof port and may be any suitable type of port, such as, but not limited to an Ethernet port (e.g., a Gigabit Ethernet (GigE) port), a serial port, a CAN bus port, or a discrete signal port, among others. In other embodiments, the number and/or types of ports may be different to suit a different set of sensors, a different ROV architecture, and/or a different type of communications link other than an acoustic type, among other things. Those skilled in the art will readily understand how to configure a module for a different local awareness/autonomy node.

This embodiment of the module 404 includes a local-area-network (LAN) switch 424 that handles packet-based communications among the processors 416(1) and 416(2) and the devices and components connected to the data ports 420(1) through 420(7). The LAN switch 424 may be any suitable network switch. In other embodiments, the communications protocol may be different such that the LAN switch 424 is replaced by another component, such as a data bus.

The module 404 includes memory 428 that contains, among other things, local awareness/autonomy software 432 that is configured to provide the requisite sparse-link compensation functionalities to the remotely supervised ROV system (not shown, but see the remotely supervised ROV system 300 of FIG. 3) with which the module 404 is used. Depending on the division of processes as between the module 404 and any other onboard computing resource onboard the ROV to which the module is deployed, the local awareness/autonomy software 432 may be composed, or partially composed, of some or all of the machine-executable instructions and algorithms discussed above relative to the local awareness/autonomy software 364 of FIG. 3. For example, if the processors 416(1) and 416(2) are designed and configured to execute all of the algorithms discussed above in connection with the local awareness/autonomy software 364 of FIG. 3, then the memory 428 (FIG. 4) may contain machine-executable instructions for all of such algorithms. However, if one or more other computing resources aboard the ROV are used, then only some of the algorithms of the local awareness/autonomy software 364 of FIG. 3 may be contained in the memory 428 (FIG. 4), with machine-executable instructions for the remaining algorithms being stored elsewhere. It is noted that the memory may be any suitable type of long-term memory or short-term memory or any combination of long-term memory and short-term memory. In the context of the appended claims, the memory(ies) used to store software of the presented disclosure is called "machine-readable storage medium", which refers to any one or more types of hardware memory. It excludes, however, any sort of transient signals, such as carrier-wave-based signals and pulsed signals that carry digital information.

Figure 5:
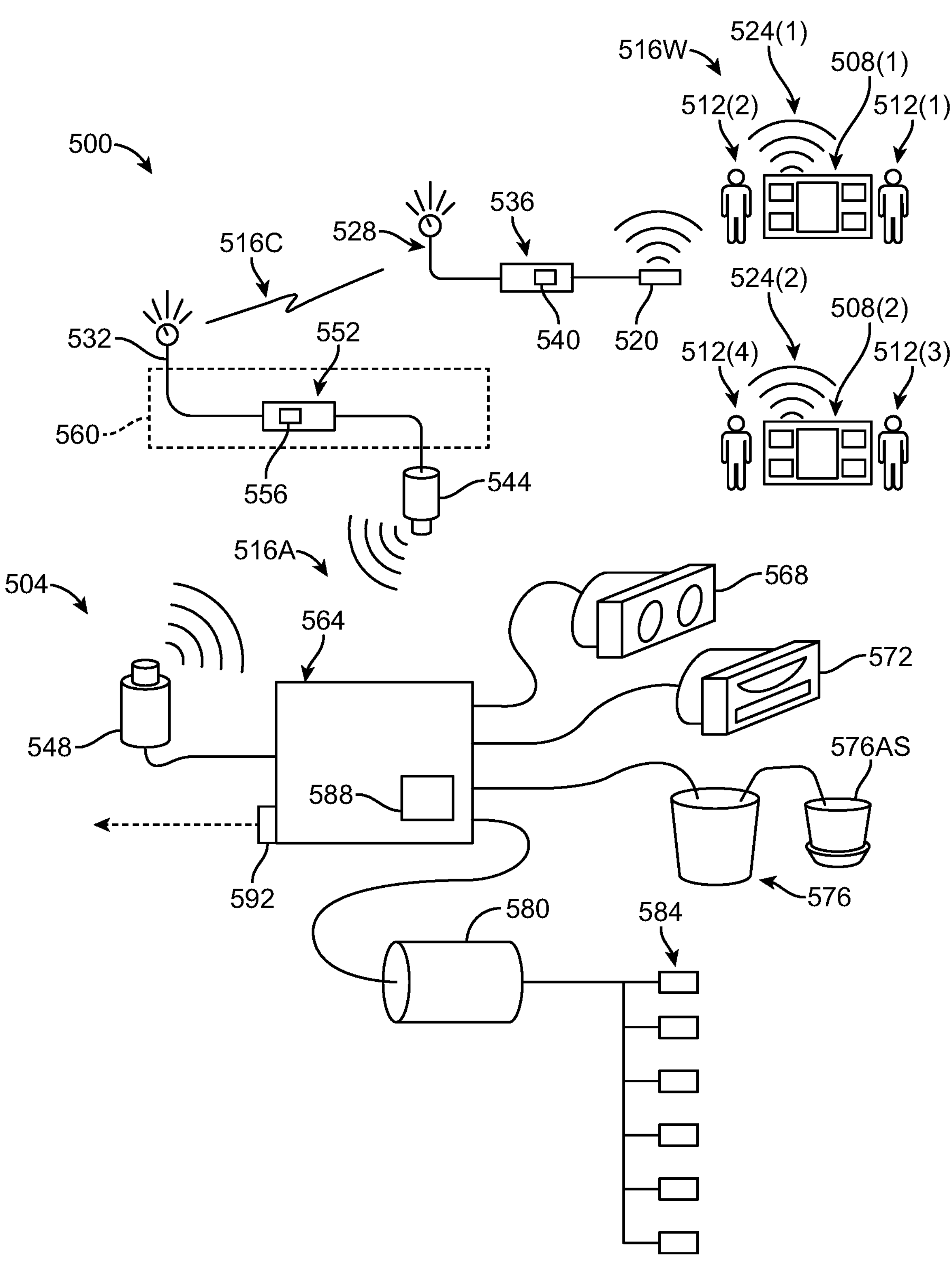
FIG. 5 is a diagram of another example remotely supervised ROV system that includes a tetherless ROV, a pair of ROV-supervisor stations wirelessly connected to a communications bridge/terminus, and a sparse datalink comprising a 4G cellular data link and an acoustic data link.

FIG. 5 is an example of a remotely supervised ROV architecture 500 that is similar to the architecture shown for the remotely supervised ROV system 300 of FIG. 3. In the example of FIG. 5, the remotely supervised ROV architecture 500 includes underwater ROV-side 504 components that allows an ROV (not shown) to be remotely supervised via one or more remote supervisory controllers, here two supervisory controllers 508(1) and 508(2), each of which may be controlled by one or more human users, here, human users 512(1) through 512(4), and may be the same as or similar to the supervisory controller 328 of FIG. 3. That said, one or both of the supervisory controllers 508(1) and 508(2) may be different from the supervisory controller 328, depending on the functions they are required to provide. Those skilled in the art will readily understand how to configure each of the supervisory controllers 508(1) and 508(2) depending on their desired functionalities. In this example, the supervisory controllers 508(1) and 508(2) communicate with the ROV-side 504 via three primary datalinks, namely, in order from the supervisory controllers to the ROV, a WI-FI® (IEEE 802.11 radio standard) network 516W, a 4G cellular network 516C, and an acoustic datalink 516A, with the acoustic datalink contributing most to the sparse-datalink nature of the remotely supervised ROV system 500.

The WI-FI® network 516W includes a WI-FI® router 520 and WI-FI® transceivers 524(1) and 524(2). The 4G cellular network 516C includes a cellular-network access point 528 (e.g., cell tower and corresponding hardware+software) and a cellular-network radio transceiver 532. The WI-FI® network 516W and the 4G network 516C are functionally coupled with one another via a communications bridge/terminus 536 that is controlled by suitable bridge/terminus software 540.

The acoustic datalink 516A includes a topside acoustic modem 544 and an ROV-side acoustic modem 548, and the cellular-network radio transceiver 532 and the topside acoustic modem 544 are functionally coupled with one another via a communications bridge 552 that is controlled by suitable bridge software 556. In an example, the cellular-network radio transceiver 532, the topside acoustic modem 544, and the communications bridge 552 may be carried by a surface vessel 560, such as an unmanned surface vessel, among others.

In this example, the underwater ROV-side components 504 include:

- a local awareness/autonomy node 564, which may be similar to either of the local awareness/autonomy nodes 308 and 400 of FIGS. 3 and 4, respectively;
- a vision system 568, here, a stereo-vision camera;
- an imaging sonar 572;
- a navigation system 576, such as an inertial navigation system with integrated sensors (not shown) and attached sensors 576AS; and
- an ROV controller 580 and associated connections to components 584 aboard the ROV, such as thrusters.

The local awareness/autonomy node 564, which essentially functions as an edge-computing node, is in communication with the ROV-side acoustic modem 548 and includes local awareness/autonomy software 588 and a service port 592, for example, for updating the local awareness/autonomy software. The local awareness/autonomy software 588 may be the same as or similar to the local awareness/autonomy software 364 and 432 of FIGS. 3 and 4, respectively. Those skilled in the art will readily appreciate that the local awareness/autonomy software 588 may be modified as needed to suit a particular application. For example, the types of sensor data available may be different from the 3D-visual-imaging data and the sonar-imaging data of the example of FIG. 5, and/or the nature of the local control that the local awareness/autonomy software 588 provides may be different, such as being particularly suited for the application at issue.

Figure 6:
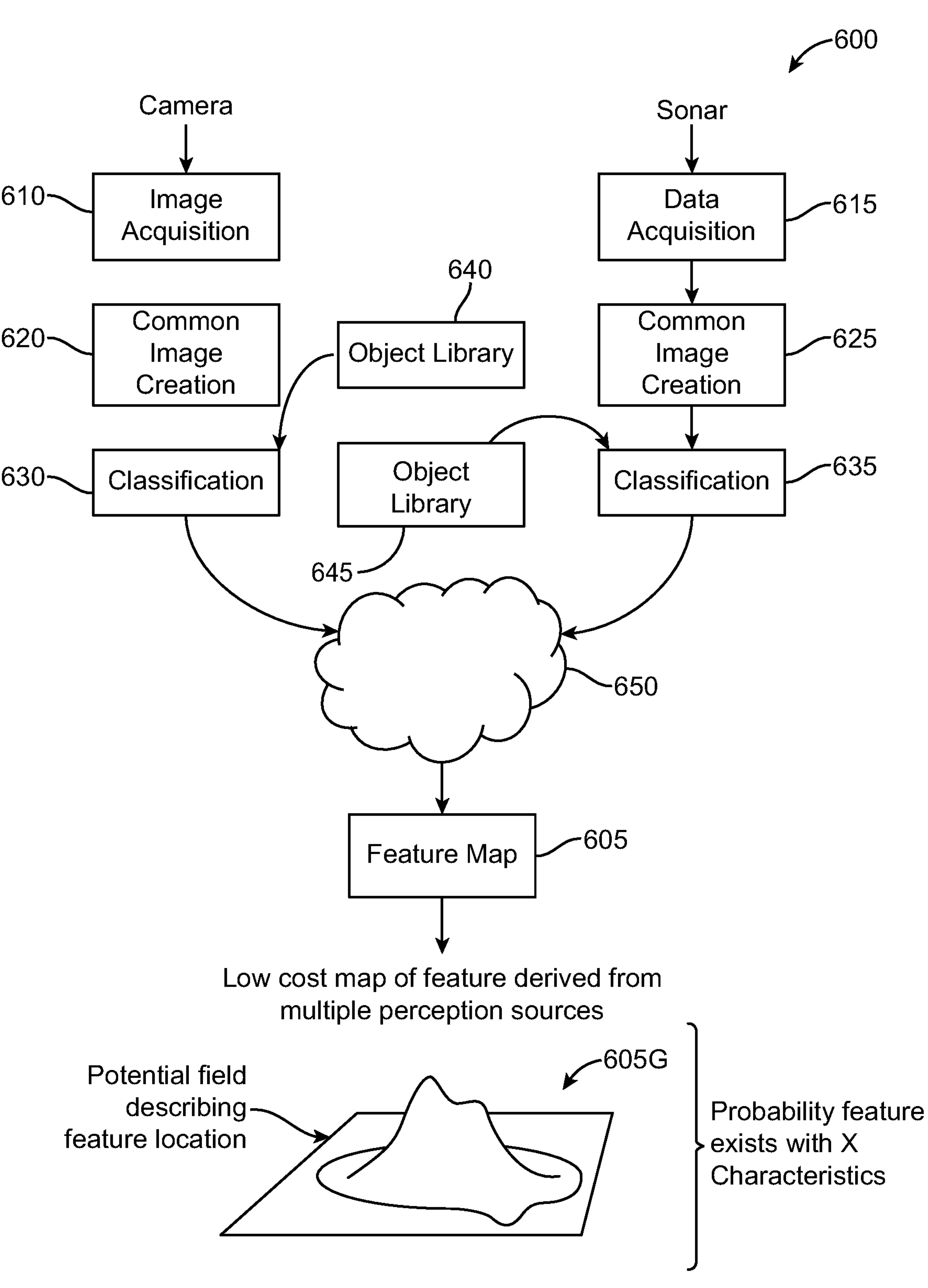
FIG. 6 is a diagram illustrating an example of building and maintaining of a low-cost feature map at a local awareness/autonomy node of the present disclosure.

FIG. 6 illustrates an example process 600 for building a low-cost feature map 605 from multiple perception sources that local awareness/autonomy software of the present disclosure, such as local awareness/autonomy software 364, 432, and 588 of FIGS. 3, 4, and 5, respectively, or other local awareness/autonomy software that provides any one or more functionalities described herein. In the example graphical version 605G of the feature map 605 shown, the "horizontal plane" (relative to FIG. 6) defines the potential field that describes feature location, and the "vertical height" (relative to FIG. 6) indicates the probability a feature exists with X characteristics. Those skilled in the art will readily understand that the graphical feature map 605G shown is merely an example provided for illustration of the example process 600.

The feature map 605 is derived from multiple perception sources, here, a camera (not shown, but see, e.g., video cameras 312C and 568 of FIGS. 3 and 5, respectively) and an imaging sonar (not shown, but see, e.g., imaging sonars 312S and 572 of FIGS. 3 and 4, respectively). In other embodiments, the set of perception sources may be different. At blocks 610 and 615, visual images and sonar data are acquired from, respectively, the camera and the imaging sonar. At blocks 620 and 625, common visual images and common sonar images are respectively created. At blocks 630 and 635, respectively, object classification is performed on the corresponding common visual and sonar images using respective object libraries 640 and 645 suitable for the image type (visual or sonar). Object classification based on visual and sonar images is well known in the art, such that further details are not needed for those skilled in the art to practice the process 600 without undue experimentation. At element 650, suitable map-building algorithms build the feature map 605. As those skilled in the art will readily understand, the feature map 605 is continually updated in real or near-real time to ensure that the autonomous control provided by the local awareness/autonomy node (not shown) is based on the most current-as-possible information about the environment of the ROV.

Example Implementations

Application: In this example and referring to FIG. 7, a remotely supervised ROV system 700 includes a conventional tethered ROV 704 that is desired to be deployed from a surface vessel 708, here an unmanned surface vessel. The ROV 704 is a "dumb" vehicle with a remote supervisory controller 712, located on the surface 716, that makes and/or issues supervisory command-and-control decisions as well as captures and displays sensor, including perception, data from the ROV to display to a supervisory operator (not shown). The remotely supervised ROV system 700 includes a typical launch and recovery system (LARS) 720 located aboard the surface vessel 708 and that comprises a winch 720W for an ROV umbilical 724 and a simple gantry 720G with a sheave (pulley) 720S by which the ROV 704 is lifted and lowered into the water 728. In this example, the desire is to deploy the ROV 704, which in its conventional use would be piloted locally by an operator working at a conventional topside ROV controller 726 (e.g., a computer) from the surface vessel 708 such that there is a fully unmanned coupled-robot solution.

Implementation: In this example, a local awareness/autonomy node 732 takes the place of an operator crew on the surface vessel 708, which allows the surface vessel to be fully unmanned as desired. As discussed above in the context of other embodiments and deployments, the local awareness/autonomy node 732 uses autonomy processes to control the ROV 704, process sensor information from the ROV 704, direct the surface vessel 708, control the LARS 720, manage the umbilical 724, and coordinate high-level supervisory information with the human supervisor stationed at the remote computer 712.

In this example, the local awareness/autonomy node 732 is installed on the surface vessel 708 with connections to the surface vessel, the LARS, the ROV, and a radio system by which it communicates back to a remotely located supervisor who is, for example, located on the beach.

Figure 7:
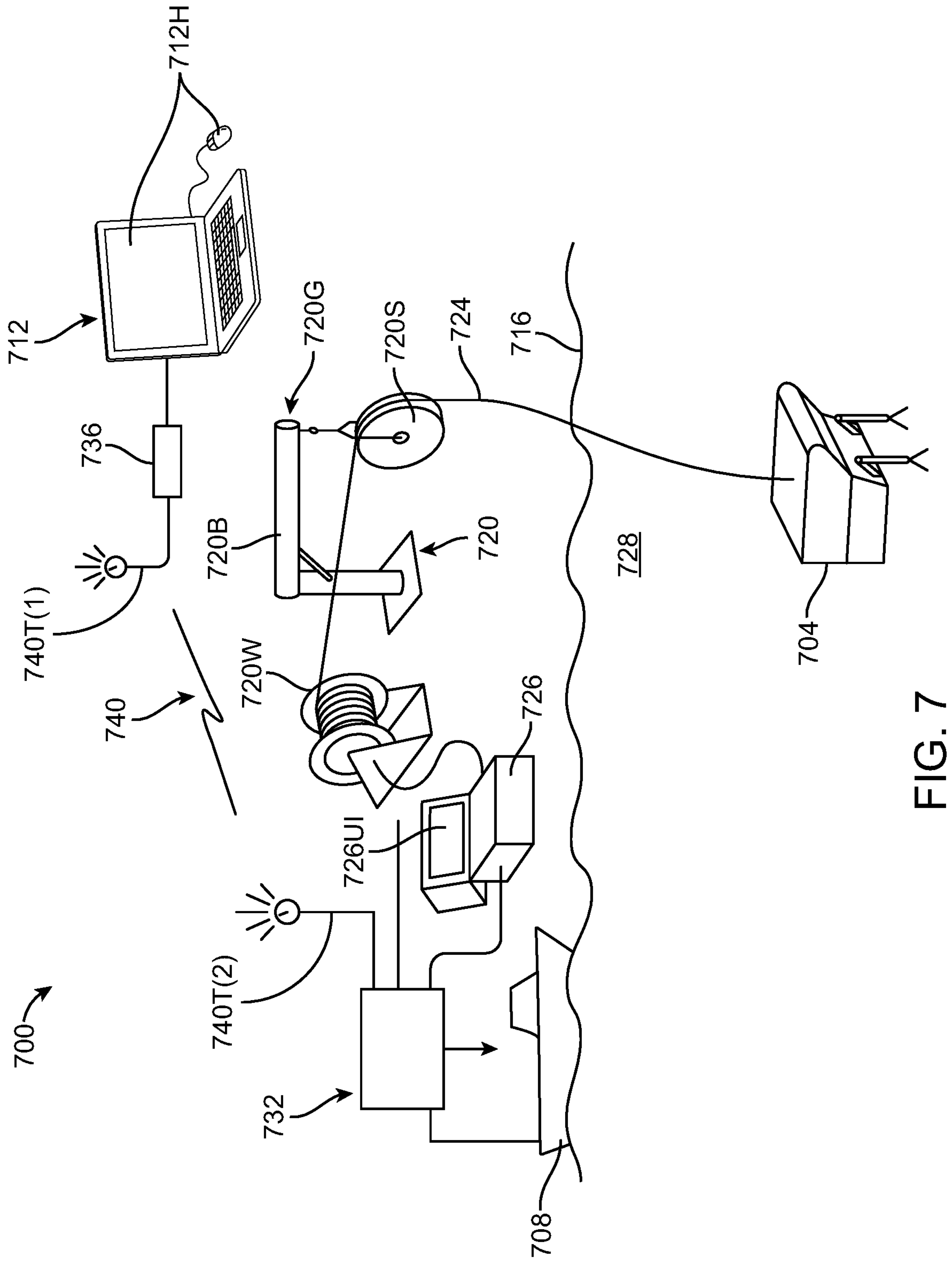
FIG. 7 is a schematic diagram of an example remotely supervised ROV system that includes a tethered ROV, an ROV-operator station wiredly connected to a communications bridge/terminus, and sparse datalink comprising an LoS radio data link.

Additional details of the remotely supervised ROV system 700 of FIG. 7 are as follows. It is noted that these details are exemplary and merely illustrative such that someone skilled in the art can make one or more suitable substitutions without undue experimentation. Where not otherwise discussed, each of the components of the example remotely supervised ROV system 700 of FIG. 7 described above and below may be the same as or similar to the like-named components described elsewhere herein.

The supervisory controller 712 may be a laptop computer, tablet computer, or other computing device, and includes an HMI 712H for monitoring and supervising the coupled subsystem composed of the surface vessel 708 and the ROV 704.

The supervisory controller 712 is connected to a communications bridge/terminus 736 that provides communication access and protocol conversion between the supervisory controller and a communications link 740 (an LoS radio link in this example). Software (not shown) inside the communications bridge/terminus 736 brokers the terminus end of the communications link 740 to synchronize, compress/decompress, and prioritize data on the communications link to manage bandwidth and latency restrictions sensed on the communications link.

In this example, the communications link 740 includes a pair of LoS radio transceivers 740T(1) and 740T(2). This example uses a commercially available LoS radio transceiver with no customization for the LoS radio transceivers 740T(1) and 740T(2). The communications bridge/terminus software of the communications bridge/terminus 736 senses the bandwidth and latency imposed by the selected transport protocol and adjusts data transmission rules accordingly to ensure the correct data is received by each end of the communications link 740 to make the current objective successful.

The local awareness/autonomy node 732 is a central hardware component of remotely supervised ROV system 700. In an example, it comprises dual processors, a waterproof housing, and multiple connectors for enabling power and data connections. The local awareness/autonomy node 732 in this example is located on the surface vessel 708 with connections to the surface vessel, the conventional topside ROV controller 726 for the ROV 704, the LARS 720, and the LoS radio transceiver 740T(2).

As noted above, the LARS 720 is required to raise and lower the ROV 704 out of/into the water 728 and take in or pay out the umbilical 724 once the ROV is in the water. The local awareness/autonomy node 732 interacts with an electric motor (not shown) on the LARS 720 to autonomously launch and recover the ROV 704, as well as to provide or take in the umbilical 724 as needed for the ROV to operate successfully. The local awareness/autonomy node 732 automates the process completely, whereas a human operator would typically do this function while aboard the surface vessel 708. Autonomous operation of the LARS 720 reduces the data required on the communications link 740.

In this example and as noted above, the LARS 720 includes the winch 720W, which is fitted with the above-mentioned electric motor (not shown). The umbilical 724 is weight-bearing and can lift the ROV 704 from the water 728. The umbilical 724 passes through a non-articulating boom 720B of the gantry 720G with the sheave 720S to redirect the umbilical from the winch 720W to the surface of the water 728, following the ROV 704.

In this example and as mentioned above, the ROV 704 is a conventionally tethered ROV. To facilitate the deployment of this conventional ROV 704 that is typically operated by a human operator via the topside ROV controller 726 on the deployment vessel, the local awareness/autonomy node 732 takes the place of the human operator and provides autonomy to operate the ROV per supervisory instructions of a remote operator working at the remote supervisory controller 712. The umbilical 724 is a non-specific hardwired (wire or fiber optic) cable between the topside ROV controller 726 and the ROV 704.

The ROV 704 in this example is a standard remotely operated subsea robot designed to be operated by a human operator in the loop in a conventional "remote control" arrangement. In other embodiments, the ROV 704 can be a commercially available ROV that has been retrofitted with a local awareness/autonomy node (not shown, but that may be similar to the local awareness/autonomy node 732) or specified with a local awareness/autonomy node from the factory or other origin.

The topside ROV controller 726 may include a conventional user interface (UI) 726UI. As noted above, the ROV 704 of this example was originally designed to be operated in a "remote control" fashion by a human operator interfacing with the ROV from the topside ROV controller 726. The UI 726UI may comprise a simple joystick (not shown) with a camera feed for the operator or a more complex and sophisticated graphical user interface. The UI 726UI may provide only open-loop control of the ROV 704 or may provide more sophisticated closed-loop functions, such as autopilots, station-keeping, and even autonomous motion control. The topside ROV controller 726 may also provide the power interface for the ROV 704. The topside ROV controller 726 provides the data output for payload and perception sensors (not labeled), such as video and sonar.

The local awareness/autonomy node 732 connects to the topside ROV controller 726. This connection may be any of a variety of physical connections (Ethernet, serial, USB, etc.) and may provide any interface required to retrieve data from the ROV 704 and provide commands to the ROV that mimic commands given by a human operator. In this example, the local awareness/autonomy node 732 has the following four connections to the ROV 704:

HMI interface. The local awareness/autonomy node 732 connects to the topside ROV controller 726 in place of a USB HMI (joystick) and mimics the inputs of the joystick to effect control of the ROV based on maneuvering solutions calculated by the self-situational-awareness-based ROV control algorithms of the local awareness/autonomy software aboard the local awareness/autonomy node.

Video interface. The local awareness/autonomy node 732 intercepts the video signal coming up the umbilical 724 via a coaxial or fiber optic connection and uses the signal to, among other things, build a feature map, such as the feature map 605 of FIG. 6.

Sonar interface. The local awareness/autonomy node 732 intercepts the sonar data coming up the tether via an Ethernet, serial, or fiber optic connection.

Navigation interface. The local awareness/autonomy node 732 intercepts navigation data coming up the tether via an Ethernet, serial, or fiber optic connection and uses the navigation data to, among other things, locate and orient the ROV 704 within its environment and/or inform maneuvering solutions calculated by the self-situational-awareness-based ROV control algorithms of the local awareness/autonomy software aboard the local awareness/autonomy node.

Another implementation of the immediately preceding integration is as follows. Either, or any other, implementation may be used. The specific data interfaces are not specific to the local awareness/autonomy node 732, as it is agnostic to the specific connection and ROV type.

ROV Data Interface. Commonly referred to as a "backseat driver interface", this is an interface, typically deployed over Ethernet, that provides data from the ROV 704, including navigation data, and accepts high-level commands to the ROV that override the native HMI connection.

Video interface. The local awareness/autonomy node 732 intercepts the video signal coming up the umbilical 724 via a coaxial or fiber optic connection or may subscribe to a streamed network video feed.

Sonar interface. The local awareness/autonomy node 732 intercepts the sonar data coming up the umbilical 724 via a coaxial or fiber optic connection or may subscribe to a streamed network video feed.

The local awareness/autonomy node 732 uses the video data, sonar data, and navigation data from the ROV 704 to develop a map of features (see, e.g., feature map 605 of FIG. 6) described by probabilities based on the navigation, video, and sonar data provided to the local awareness/autonomy node via the interfaces to the topside ROV controller 726. Based on the derived situational awareness of the ROV 704 and the current objective provided by the supervisor via the supervisory controller 712, the local-awareness/autonomy software running in the local awareness/autonomy node 732 derives a desired state of the ROV 704 and issues maneuvering, or individual thruster, commands to achieve the desired state of the ROV. These combined autonomy processes of sense-perceive-calculate-command take the place of a local human operator for the ROV 704.

An noted above, the ROV 704 is deployed from the surface vessel 708. The surface vessel 708 is an independent system relative to the ROV and is simply the transport for the ROV system to a launch position. While the ROV 708 is deployed from the surface vessel 708, the surface vessel 708 must maintain a position conducive to the operation of the ROV 704 and then position itself to facilitate recovery of the ROV. Typically, a human operator commands the surface vessel 708 via teleoperation over a wireless link. To deploy an ROV in a conventional manner, however, the human operator of the surface vessel 708 needs close communication with the human operator of the ROV. In this example, however, the local awareness/autonomy node 732 handles this coordination automatedly through local control of the surface vessel 708 based on the output from the local-awareness/autonomy software for the ROV 704 considering a coupled relationship between the surface vessel and the ROV. The local awareness/autonomy node 732 provides positioning and trajectory information to the surface vessel 708, for example, via a standard "helmsman" or autopilot interface (not shown) implemented over a common industry standard, such as the National Marine Electronics Association (NMEA) NMEA-0183 standard or the NMEA-2000 standard, among others. The local-awareness/autonomy software running in the local awareness/autonomy node 732 determines the optimal location of the surface vessel 708 to accomplish the objective of the ROV 704 and issues commands to the surface vessel to achieve the desired state of the surface vessel. The local awareness/autonomy node 732 receives the state of the surface vessel 708 from this same interface or, in optional yet equal configurations, via separate interfaces for a global positioning system (GPS) location and heading.

The surface vessel 708 may be an independent robot system that is conventionally teleoperated by a human operator via a wireless link. The surface vessel 708 is non-specific to this implementation or the local awareness/autonomy node 732, which in this example is agnostic to the actual deployment platform and may commonly be deployed on manned or unmanned assets.

Example 2

Application: In this example and referring to FIG. 8, a remotely supervised ROV system 800 includes a conventional ROV 804 modified to work without a tether while requiring infrequent (non-real-time or non-near-real-time) supervision and tasking updates from a network of remote human supervisors, here supervisors 808(1) through 808(4). The ROV 804 is configured at the factory to operate without a tether by using batteries for the local power source and using a local awareness/autonomy node 812 as a substitute for real-time command and control by the human operator (not shown) which is traditionally supplied via hardwired (electrical or fiber optics) connections in the tether that the ROV was originally designed to use. In the present application, the ROV 804 is deployed using a mobile-gateway buoy 816 that serves as a gateway between an acoustic communications link 820 and a satellite communications link 824.

Implementation: In this example, the local awareness/autonomy node 812 replaces the tether on the ROV 804 with local-awareness/autonomy software (not shown) in a cluster of local processors (not shown) aboard the ROV that integrates data from perception sensors (not shown, but, e.g., a video camera and an imaging sonar) to compile local situational awareness and execute high-level objectives provided by one or more supervisor, here, four supervisors 808(1) through 808(4).

The local awareness/autonomy node 812 is installed on the ROV 804 with connections to the mobile-gateway buoy 816 and the conventional electronics and other systems (not shown) aboard the ROV. As discussed below, the mobile-gateway buoy 816 communicates via a couple of communications links back to the remotely located supervisors 808(1) through 808(4), located, for example, on a beach, a sea platform, and/or a ship, among other places. In this application, the local awareness/autonomy node 812 allows untethered supervision of a modified traditionally tethered underwater ROV 804 from over-the-horizon by a network of remote supervisors 808(1) through 808(4) regardless of the bandwidth available in the connection protocols.

Figure 8:
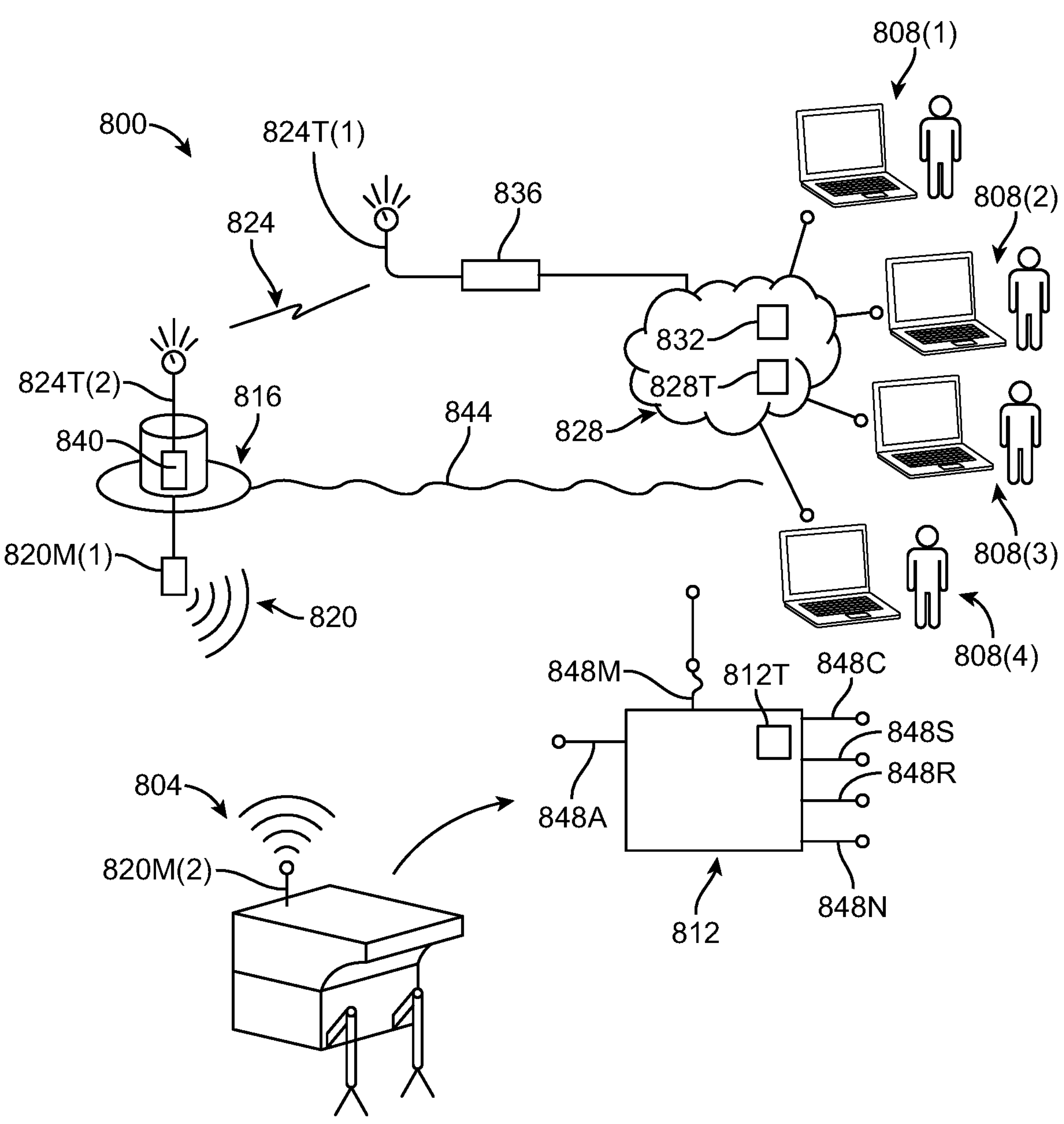
FIG. 8 is a schematic diagram of an example remotely supervised ROV system that includes an untethered ROV, a network of ROV-supervisor stations connected to a local-area network (LAN), and a sparse datalink comprising an LoS radio data link and an acoustic data link.

Additional details of the remotely supervised ROV system 800 of FIG. 8 are as follows. It is noted that these details are exemplary and merely illustrative such that someone skilled in the art can make one or more suitable substitutions without undue experimentation. Where not otherwise discussed, each of the components of the example remotely supervised ROV system 800 of FIG. 8 described above and below may be the same as or similar to the like-named components described elsewhere herein.

ROVs are typically operated by a single operator or a small team of operators co-located with the ROV, physically limited in reach by the tether of the ROV. In the application illustrated in FIG. 8, a network of supervisors 808(1) through 808(4) is facilitated due to the inclusion of the local-awareness/autonomy node 812. The remotely supervised ROV system 800 implements a supervisory tasking architecture that enhances the otherwise traditional ROV 804 such that supervisors 808(1) through 808(4) are not relying on real-time data for supervising the ROV. The remotely supervised ROV system 800 of this example provides an open network 828 for participating in the supervision and monitoring of the ROV 804.

In this example, the open network 828 provides an HMI 832 that can be, for example, a web application or a custom built app. However, in other embodiments, the HMI can be a local application running on a personal device (e.g., laptop computer, tablet computer, custom device, etc.). Regardless of the form, the HMI 832 simply allows one or more human supervisor, here, supervisors 808(1) through 808(4) to receive updates on the ROV 804 and issues high-level task orders. The open network 828 may be, for example, a LAN or a wide-area network (WAN, or "cloud-based network"). In this embodiment, open network 828 allows any user with credentials access to the ROV 804.

In this example, the satellite communications link 824 includes a pair of satellite transceivers 824T(1) and 824T(2) operatively connected, respectively, to the open network 828 and the mobile-gateway buoy 816. A communications bridge/terminus 836 is operatively connected between the satellite transceiver 824T(1), and a communications bridge 840 is operatively connected to the satellite transceiver 824T(2) aboard the mobile-gateway buoy 816. The communications bridges/terminus 836 and 840 provide processing for the handling of the requisite data/communications arbitration layer.

As with other embodiments disclosed herein, the remotely supervised ROV system 800 allows communication between one or more remote supervisors, here, supervisors 808(1) through 808(4) and an ROV on the seafloor, here, the ROV 804, regardless of protocols used and available bandwidth, by arbitrating data through prioritization, compression, selection, and synchronization to insure the task being attempted by the supervisor(s)/ROV team is successful. To do so, the remotely supervised ROV system 800 manipulates the data at either end, i.e., the supervisor end and the ROV end, to 1) ensure that the ROV 804 receives the data required to execute the objectives of the supervisors 808(1) through 808(4), and 2) to ensure that the supervisors receive the data required to understand the status of the ROV. One data-manipulation terminus 812T is resident in the local awareness/autonomy node 812 located at the ROV 804 and another data-manipulation terminus 828T is resident at the consumer-end with the supervisors 808(1) through 808(4), in this case in the open network 828. When multiple protocols are used between the ROV 804 and the supervisors 808(1) through 808(4), such as in this example, the communications bridges/terminus 836 and 840 are used to hop the protocols and ensure the data arbitration is successful. As those skilled in the art will readily understand, each of the communications bridges/terminus 836 and 840 is a software system and is hardware agnostic.

In this example, the acoustic communications link 820 utilizes a pair of acoustic modems 820M(1) and 820M(2) located, respectively, on the mobile-gateway buoy 816 and on the ROV 804, to transfer data between the communications bridge 840 mounted on the mobile-gateway buoy and the local awareness/autonomy node 812 mounted on the ROV. In an example, each acoustic modem 820M(1), 820M(2) may be a commercial off-the-shelf (COTS) acoustic modem. The mobile-gateway buoy 816 is used to float the communications bridge 840, the acoustic modem 820M(1), and the satellite transceiver 824T(2) on the water surface 844 to provide a transition between above and below water communications. The mobile-gateway buoy 816 is simply a buoy in this application, but the mobile gateway could be provided by any floating or fixed structure that provides a mounting point for the communications bridge 840, the acoustic modem 820M(1), and the satellite transceiver 824T(2). Examples of alternatives to a buoy include, but are not limited to, a manned vessel, an unmanned vessel, a pier, a dock, a piling, an offshore wind turbine, an offshore oil platform, and a buoy, among others.

In this application and as noted above, a traditional ROV 804 is used but with the local awareness/autonomy node 812 installed thereon (along with a conventional battery system (not shown)) to facilitate supervising the ROV without a tether by a network of the supervisors 808(1) through 808(4) over-the-horizon. The ROV 804 may be provided with the local awareness/autonomy node 812 from the manufacturer, retrofit post-acquisition, or modified by supervisors for the purpose of tetherless operation. In this example application, the ROV 804 is a traditional and commercially available platform with payloads, manipulators, and tools (not labelled). Alternatively, the ROV 804 may be custom built for a specific application. The local awareness/autonomy node 812 enables tetherless operation at any distance of separation from the supervisors 808(1) through 808(4), regardless of bandwidth and latency, using any data transmission system.

As can be appreciated from discussion above, the local awareness/autonomy node 812 is a primary component of a remotely supervised ROV system of the present disclosure, including the remotely supervised ROV system 800 of this example. In this example application, the local awareness/autonomy node 812 is mounted on the ROV 804 and interfaces to a video camera (not shown, but see, e.g., the video cameras 312C and 568 of FIGS. 3 and 5, respectively), an imaging sonar (not shown, but see, e.g., the imaging sonars 312S and 572 of FIGS. 3 and 5, respectively), the ROV itself, the acoustic modem 820M(1), and a navigation system (not shown, but see, e.g., the navigation system 576 of FIG. 5), via corresponding respective camara, sonar, ROV, acoustic-modem connections, and navigation system connections 848C, 848S, 848R, 848M, and 848N, respectively, while providing an auxiliary connection 848A for downloading missions via a direct hardwired connection prior to deployment. The local awareness/autonomy node 812 may contain a cluster of processing modules (not shown) (e.g., two in this application). Similar to the local awareness/autonomy node 308 of FIG. 3, one processing module interfaces with the video camera, while the other processing module interfaces with the imaging sonar. The navigation, command and control, autonomy, and payload interface software modules (not shown) are distributed across the cluster of processors as available and communicate via a publish-subscribe network (not shown). The exact architecture of processors is not specific to the disclosed remotely supervised ROV system 800 and may be modified to accommodate the number of perception sensors onboard, the processing power of the processors, and/or the needs of the ROV 804. In an example, all software is deployed as distributed modules in a publish-subscribe architecture to facilitate the flexible configuration of edge processors as required.

The local awareness/autonomy node 812 is responsible for interfacing with the perception sensors and navigation system to develop and maintain situational awareness for the ROV 804. Using the navigation sensors aboard the ROV 804, the local awareness/autonomy node 812 maintains a state estimate describing its position with respect to a world frame. Using data from the perception sensors with an onboard machine-learning library of known objects, the local awareness/autonomy node develops and maintains a "scene" (not shown, but see feature map 605 of FIG. 6) composed of probabilities describing the presence and classification of objects within the scene. By decomposing the real-time and high-bandwidth data of the perception and navigation sensors into a single world-view state estimate and feature map of classified features, the local awareness/autonomy node can communicate situational awareness over a very low-bandwidth and high-latency communications link, i.e., the acoustic communications link to the remote supervisors 808(1) through 808(4), enabling the operation of the robot over an ad hoc arrangement of links and protocols to a supervisor located anywhere in the world. The scene composed of probabilities describing classified objects enables long-term scene development with very little processor requirements.

The local awareness/autonomy node 812 receives objectives from one or more of the supervisors 808(1) through 808(4) via the open network 828, satellite communications link 824, and acoustic communications link 820. With the onboard state estimate and local scene composed of probabilities describing classified objects, the local awareness/autonomy node 812 determines maneuvering solutions and payload operations for the ROV 804 to accomplish the objectives specified by the supervisor. In this example, the local awareness/autonomy node 812 is not ROV or sensor dependent and provides a hardware agnostic solution through open architecture and distributed software. The local awareness/autonomy node 812 provides "customer" processor space for the inclusion of specific artificial intelligence (AI) and machine-learning (ML) libraries as needed for the particular application.

The camera connection 848C allows the local awareness/autonomy node 812 to interface with any available video camera, including monocular and stereo cameras. The local awareness/autonomy node 812 receives video images via proprietary or specific formats and converts them to a common format used by the onboard processing engine, thus enabling the use of any video camera for vision-based perception. Onboard perception processing uses trained machine-learning libraries provided, for example, by an end-user of the remotely supervised ROV system 800 or for the specific application, to allow the ROV 804 to classify its surroundings.

The sonar connection 848S allows the local awareness/autonomy node 812 to interface with any available sonar system, including sonar systems of the multibeam, scanning, or sidescan type. The local awareness/autonomy node 812 receives the sonar data via proprietary or specific formats and converts it to a common format used by the onboard processing engine, thus enabling the use of any sonar for acoustic-based perception. Onboard perception processing uses trained machine-learning libraries provided, for example, by an end-user of the remotely supervised ROV system 800 or for the specific application, to allow the ROV 804 to classify its surroundings.

The navigation connection 848N allows the local awareness/autonomy node 812 to interface with any available navigation system using any industry-standard interface or any proprietary interface. The local awareness/autonomy node 812 converts the data provided by the navigation system into a common format and publishes it on the local public-subscribe network for consumption by the rest of the software system. In the absence of a complete navigation system, the local awareness/autonomy node 812 can accept data from disparate sensors and compute its own navigation solution using an onboard fusion and state estimation algorithm. The local awareness/autonomy node uses the navigation data to develop and maintain a state estimate that it publishes across the edge processing cluster for consumption by various software processes, including the autonomy and command-and-control systems.

In an example, the local awareness/autonomy node 812 is non-specific to ROVs and is designed as a modular and independent solution for underwater robots. The ROV connection 848R allows the local awareness/autonomy node 812 to interface with a thruster network aboard the ROV to maneuver the ROV as required by the output of the autonomy algorithms of the local awareness/autonomy node.

In this example, the auxiliary connection 848A provides an Ethernet connection for maintenance and configuration of the ROV 804 during service activities and prior to deployment. The auxiliary connection 848A allows supervisors to download pre-designed mission plans that describe the missions and objectives to be accomplished by the ROV 804 upon deployment.

Example 3—Ship Hull Cleaning Robot

Robots are being considered as viable alternatives for cleaning ships below the waterline as a solution for managing biofouling. While this task has typically been conducted by human divers, robots are showing promise because sensors and bandwidth are now suitable for operators to achieve a suitable situational awareness of the environment. Robots are typically deployed on a ship with the operator located in close proximity. These robots are remotely controlled devices and utilize a hard-wired connection between the robot and the operator to provide the bandwidth required for adequate feedback and control.

It is highly desirable to clean ships at sea, underway, and in any port or harbor regardless of data connection. Because it is unrealistic to have the skillset within the crew to effectively operate a complex robot, a remote operator is required to operate the robot. To implement this scenario, operators must control the robot over data connections with typical bandwidths of 1 kpbs and typical latencies measured in minutes.

Ship cleaning robots exist, are commonplace, and have proven effectiveness. However, features of the present disclosure enable the use of these existing systems with a new operational methodology wherein the operator is remote and any available data connection may be used. Utilizing these features, for example, in the deployment shown in FIG. 7, allow remote operators to utilize existing ship hull cleaning robots (here, ROV 704) in a remote configuration regardless of the integrity and capabilities of the available datalink, which may be or include at least one sparse datalink.

In this example and referring to FIG. 7, the local awareness/autonomy node 732 is installed on the ship (e.g., the surface vessel 708) to "replace" the crew typically required to operate the ROV 704 in a local configuration. The remote operator interacts with software on the local laptop 712 to supervise the system.

Configuring the existing conventional system to use the features of the present disclosure is mostly accomplished by simply connecting the local awareness/autonomy node 732 to the existing ship hull cleaning robot system (remotely supervised ROV system 700) via a LAN connection and then connecting a the local awareness/autonomy node 732 to any available communications link 740. The available communications link 740 can be, for example, cellular, VSAT, LoS radio, or any other network-type connection.

The operator uses a laptop 712 running software (not shown) capable of displaying data coming back from the vehicle and sending desired tasks to the robot. This laptop 712 is connected to a communications terminus 736, which works with the local awareness/autonomy node 732 to decrypt, manage, and synchronize data sent and received along the data link.

There is no application specific configuration required to modify the existing ship hull cleaning robot, ROV 704, and enable it for remote use beyond programming the behaviors required for autonomy.

In this example, there are three features of the present disclosure needed to enable remote operation of the ship hull cleaning robot, ROV 704, over one or more sparse data links: 1) autonomy on the local awareness/autonomy node 732 to allow for reduced downstream bandwidth; 2) situational awareness development on the local awareness/autonomy node 732 to allow for an adequate awareness of the work space; and 3) bandwidth management along the communications datalink 740. The remotely supervised ROV system 700 provides features 2 and 3 without any specific configuration from an integrator that adapts the conventional ship hull cleaning system to the remotely supervised ROV system. To enable the autonomy within the local awareness/autonomy node 732, which ultimately provides a critical component of enabling the sparse data link, in an example the system integrator must configure an autonomy engine (not shown) located aboard the local awareness/autonomy node. As those skilled in the art will readily appreciate, the autonomy engine may be implemented using any suitable autonomy model, such as a behavior tree or a state machine. In this example, a behavior tree is used because of its ability to more easily handle complex automation than a state machine.

The behavior tree in the local awareness/autonomy node 732 facilitates the reduction of data between the remote operator and the ROV 704 and increases the allowable latencies between data packages by moving the command structure from a "remote control" command structure to a "remote supervision" command structure. In the former and as discussed generally above, the operator is providing low level commands based on her own development of situational awareness given robust sensor data, and in the later, the operator is issuing objective-based commands given objective-based feedback. The behavior tree specifies behaviors, which can be organized as objective-based tasks, that gain context given valid situations and are aggregations of low-level commands executing on system data.

The local awareness/autonomy node 732 may employ a typical behavior tree structure to reduce complex and high data rate low level commands to simple objective-based tasks. Configuring the behavior tree for the ship hull cleaning robot, ROV 704, would typically require an operator skilled in the art of cleaning ships with robots to define the tasks required to execute the job and that would need to be modeled in the behavior tree. For example, the operator would need to link lower level tasks to these higher level tasks and specify the situational context within which the task is valid. This configuration could be done, for example, by simply editing a configuration file.

Define High-level Tasks. The system integrator may first define the high-level tasks. Higher-level tasks require less bandwidth and are more tolerant to data latencies. Non-limiting examples: "Clean Starboard Hull"; "Clean Water Line"; "Locate and Attach to Ship".

Define High-level Situational Context for Each High-level Task. Situational context is a description of the operating environment required for a task to be performed successfully. Non-limiting examples: "Operable Robot"; "Obstruction Free Region"; "Biofouling Detected"; "Cleaning Region Incomplete".

Link Low-level Tasks to High-level Tasks. Linking low-level tasks to high-level tasks provides the ROV 704 the understanding of what it must execute to accomplish the objective. This process of using lower-level tasks in aggregate to create high-level tasks can continue indefinitely to provide greater and greater abstraction for tasking. Non-limiting examples of low-level tasks required to accomplish the high level task of "Clean Starboard Hull": "Locate Bow of Ship"; "Define 50 m Cleaning Region"; "Create Cleaning Path Inside Region"; "Clean Path". These tasks may again be containers of lower-level tasks until the task is calling native robot commands present in the existing robot architecture. Non-limiting examples of these commands could include: "Forward 50%"; "Turn Right"; "Run Brushes". These commands are native in the existing robot architecture and are typically what a local operator would be commanding in a conventional remote control configuration.

Link Low-level Data to High-level Situational Awareness. In the same way high-level tasks are aggregations of low-level tasks until reaching a level of native commands within the ROV 704, high-level situational awareness is an aggregation of low-level system data. System integrators may simply create higher-level situational awareness descriptions from logical combinations of lower-level situational awareness descriptions or lower-level data. The lowest-level data would be data available in the datalink given a traditional remote control configuration and including data from a feature map (see, e.g., feature map 605 of FIG. 6). Examples of lower-level data used to define a higher-level situational awareness of "Obstruction Free Region": "Objects Detected" AND "Avoidance Paths Created".

In this application, very minimal information is required for the supervising operator to effectively complete the task. The local awareness/autonomy node 732 requires no a priori knowledge of the ship hull. To clean the hull, the local awareness/autonomy node 732 defines a region by outlining the largest possible navigable area of the hull and then fills the region paths having spacing adequate to ensure sufficient coverage with the cleaning tool aboard the ROV 704. The local awareness/autonomy node 732 conveys the region transited as a list of points whose connections describe the path executed to clean.

As the local awareness/autonomy node 732 drives the ROV 704 to navigate the ship hull, it maintains a situational awareness of the ship hull using sonar and video data acquired, for example, using sensors onboard the ROV. This world view may be a list of probability wells whose size (mass), position, and probability describe the features extracted from the perception data. This feature map of features is easily sent over the datalink at a fraction of the bandwidth required to send typical perception data.

Example 4—Maritime Explosive Ordnance Disposal Robot

Maritime explosive ordnance-mines and bombs in the ocean—are a popular, strategic, and inexpensive form of warfare and terrorism. These munitions are difficult to detect, available readily, and are able to kill indiscriminately for decades after the moment they are deployed. While capabilities for detecting maritime explosive ordnance have improved somewhat with the advent of new sensors and search methods, capabilities for disposal have changed little since World War II. Human divers are still deployed to investigate targets and neutralize threats.

Over the past two decades, significant work has gone into developing robots that can replace divers in the localization, identification, and neutralization process of ocean mine clearing, typically referred to as Explosive Ordnance Disposal (EOD). These robots have become quite capable and are just—as of 2022—becoming widespread in their use and consideration as viable tools to combat ocean mine warfare. A significant shortcoming remains with the robots, however. They require the local presence, typically stationed in a small boat above the mine, of skilled operators. These robots are tethered to the surface via control umbilicals and are operated via remote control.

Robots to facilitate maritime EOD activities are becoming commonplace as significant product development has produced tools, software, sensors, and procedures to effectively locate, identify, and neutralize subsea mines using these systems. Widespread adoption will not occur until these systems can provide scale and safety for the warfighter, which requires providing a safe standoff, far longer than any tether can allow, for the operator.

The fundamental challenge of allowing long-range standoff for an operator using a robot in maritime EOD tasks is bandwidth. Providing the bandwidth required to transmit sensor data and robot commands over several miles between a submerged robot and an operator is effectively impossible. Datalinks through the water column do not support the bandwidth required for adequate control of these robots.

Features disclosed in the present disclosure, however, can allow the remote operation of a standard robot developed for EOD tasks from a safe standoff distance and allow the robot to be deployed without a tether, utilizing any available communications path or network of communications paths, including but not limited to acoustic communications, LoS communications, cellular communications, and satellite communications, and any combination thereof.

In an example, the accompanying FIGS. 3 and 5 are used illustrate an application of features of the present disclosure to the EOD task. In this example, the local awareness/autonomy node 308, 564 is embodied in a hardware module that plugs into the current and traditionally tethered robot (see, generally, ROV 304) and allows an operator to control the robot from a long standoff distance without a tether. The local awareness/autonomy node 308, 564 to integrate edge processing autonomy and situational awareness on the robot 304 while the topside communications bridge 348T, 552 provides a bandwidth-managed link to the operator using common and currently in place acoustic communications modems 360T+360R, 544+548.

The local awareness/autonomy node 308, 564 allows the effective use of the robot/ROV 304, while designed for local remote control operation via a hardwired tether, to be used in a long range standoff configuration without a tether over sparse data links. The local awareness/autonomy node 308, 564 does not simply provide a transparent data link allowing the removal of the tether. The bandwidth required for the robot/ROV 304 will typically exceed 12 Mbps with an requirement for no more than 50 ms of latency. The local awareness/autonomy node 308, 564 allows the operation of the robot/ROV 304, with no modifications to the robot/ROV itself, over a datalink providing as little as 100 kbps and up to minutes of latency. It does so by minimizing the data required to be transmitted over the datalink and managing what data is transmitted over the datalink so that it is coherent and meaningful to the operator and the robot/ROV.

Implementation of the local awareness/autonomy node 308, 564 requires a system integrator to install and connect the necessary hardware components (e.g., the module containing the local awareness/autonomy node, the communications bridge 348T, 552, and the communications terminus 344C, 536) and then define the autonomous behaviors of the system that aggregate the supervisory control commands from the operator to the robot/ROV, thereby providing a higher-order and supervisory communications scheme versus the traditional remote control communications scheme.

The supervisory communications scheme reduces data on the datalink and enables the operation of the traditionally tethered remote control robot/ROV 304 over a sparse datalink because it moves the aggregation of data and tasking from the operator to the robot/ROV. The local awareness/autonomy node 308, 564 integrates with individual sensors (e.g., vision system 568 and imaging sonar 572) on the robot/ROV 304 to compose and manage the situational awareness for the robot/ROV relevant to the tasking and provides a behavior architecture to abstract low-level control typical of remote control applications into high-level objective based tasking. The local awareness/autonomy node 308, 564 allows the transmission of a simplistic probabilistic world view (see, e.g., feature map 605 of FIG. 6) as opposed to discrete sensor data and the transmission of supervisory control commands, such as "Find Mine", in contrast to low-level commands like "Move Forward", "Turn Right", and "Dive". The structure for this may be made available to the system integrator, for example, through a configuration file based behavior definition or other autonomy modeling feature.

Once the system integrator has installed the hardware components that provide the sparse-network compensation, she may only need define the behaviors of the system. The local awareness/autonomy node 308, 564, in combination with the communications bridge 348T, 552, and the communications terminus 344C, 536, will automatically manage bandwidth to the lowest required rate and interface with the components and perception sensors of the robot/ROV 304 to create local situational awareness. In an example, the operator may define behaviors for the robot/ROV 304 through a text based configuration file using a standard markup language familiar to anyone skilled in the art.

Tasks may be defined in a hierarchical order wherein high-order tasks that specify objectives and goals are aggregations of lower-order tasks and lower-order tasks are aggregations, eventually, of native commands present in the base robot command structure.

High-order Task Definition. The system integrator will begin by defining the high-order objective-based tasks for the system required to accomplish the mission. In the example of the EOD robot/ROV 304, this may be consistent with the concept of typical EOD operations, such as: "Search for Suspected Mines"; "Notify Operator of Suspected Mines"; "Identify Suspected Mine"; "Inspect Suspected Mine"; "Neutralize Suspected Mine"; and "Return Home".

Low-order Task Aggregation. The system integrator may then define and aggregate low-order tasks to complete the high-order tasks. To define, for example, the high-order task "Search for Suspected Mines", the operator may define lower order tasks such as "Define Search Area", "Transit to Search Area", "Enable Automatic Target Recognition", "Run Search Pattern". The process of defining these lower-level tasks will continue until the system integrator can define a task entirely of commands native to the robot's current command and control schema. Examples of these tasks may be "Move Forward", "Turn Right", "Power On Sonar", "Dive".

Contingency Behaviors. A common architecture for behavior-based autonomy is to allow behaviors to run as long as they have context. Context is defined by acceptable parameters derived from the situational awareness. Should a behavior lose context, the local awareness/autonomy node 308, 564 may be configured to auto-select one or more behaviors that do have context. In certain cases, the system architect may define behaviors to explicitly handle certain parameters. These are known as "contingency behaviors". Examples of contingency behaviors could be "Avoid Obstacle", "Low Power Mode", and "Loss of Communications". The system integrator will define contingency behaviors as she defines any other behaviors, except contingency behaviors will have specific context associated with a system fault or issue to manage.

Situational Awareness Definition. The local awareness/autonomy node 308, 564 will execute behaviors when a defined behavior has context, with the context defined by a set of parameters derived from the wholistic situational awareness of the robot/ROV 304. Similar to behaviors, situational awareness is aggregated from low-level native data elements within the robot/ROV 304 that measure discrete things in the environment to high level concepts that describe the operating environment in a context relevant to the task at issue. Examples of situational awareness may be "Obstacle Detected", "Known Mine Detected", "Area Searched".

Link Low-level Data to High-order Situational Awareness. A significant element of situational awareness is handled automatically by the local awareness/autonomy node 308, 564. The local awareness/autonomy node 308, 564 interfaces with the sonar system 572 and the vision system 568 to reduce the world perceived and measured with high-resolution acoustic and camera data into simple probability wells of a feature map that describe the likelihood of features with certain descriptions existing at certain locations. The observations from such a feature map can be used as low-level data within the local awareness/autonomy node 308, 564 to describe higher level situational awareness concepts. Similarly, the local awareness/autonomy node 308, 564 can aggregate low-level data through logical processes to describe high-level concepts. For instance "Obstacle Detected" could be defined as an aggregation of "Feature with Probability Greater than X" AND "Feature Larger than Y" AND "Feature with Position=Desired Position of Robot".

Once operational, the operator can use a software application (e.g., the supervisory software 368) to display the data received from the robot/ROV 308 and to transmit the defined tasks as supervisory control commands.

Example Features of Remotely Supervised ROV System

Following are some example features that at least some embodiments disclosed herein can provide in any suitable combination. Other features of one or more embodiments will be apparent to those skilled in the art when designing apparatuses, methods, and systems of the present disclosure for particular applications. The example features include:

- Replacing a hardwired cable (tether) between an underwater robot and an operator's console without compromising the effectiveness or capability of the robot.
- Converting a traditionally cable-tethered underwater vehicle into a wireless underwater vehicle without modification to the underwater robot control system/robot platform.
- Allowing the automation of specific tasks on an underwater robot without modification to the underwater robot control system.
- Compensating for the loss of bandwidth and increased latencies in one or more data communications links when a hardwired link is replaced by sparse datalink such as an acoustic link, radio link, cellular link, satellite link, or any combination thereof.
- Being agnostic to protocols or datalinks used and accommodating multiple datalinks between a supervisor and a robot by providing an open architecture plugin interface that defines a datalink used while keeping a data management system transparent to the datalink employed.
- Being agnostic to robot types/robot platforms and adapting to specific robots through the installation of a translation software application that translates the output of the sparse-link compensator to the exact protocol and interface required by a specific robot.
- Preserving the capability of a robot in any data exchange configuration regardless of the amount and timing of data available over a datalink through, for example, any one or more of the following methods:
  - Determining the "objective" and prioritizing and transmitting only the data required for the robot to accomplish the objective.
  - Sensing the datalink at each interface node and managing the data across the link interface such that it fits through the bandwidth of the datalink.
  - Allowing the native protocol handler (TCP, UDP, serial, cellular, etc.) hardware to transmit data as required on the hardware level and reassembling the data to eliminate relative latency between data objects and data streams. Decoupling the producer/ consumer software layers from the hardware transport through synchronized destruction and construction of data streams allows agnostic support for transmission hardware and protocols without impact to the performance of the robot system.

Allowing system integrators to specify a rule table for managing data and bandwidth over datalinks.

Capturing perception data on the robot and forming a world view of situational awareness in the form of a classified potential-field feature map having feature classifications.

Maintaining and providing the classified potential-field feature map to the supervisor instead of data intensive raw perception feeds that require significant bandwidth and data storage resources.

Providing an objective-based autonomy engine on the robot to respond to high-level commands from the supervisor that reduce the amount of transmitted data over the link.

Linking the classified potential-field feature map to an autonomy engine so that the robot can operate within the world view without the supervisor having to provide maneuvering commands.

Ingesting navigation data into the robot processor to maintain a state estimate local to the robot without the need for the supervisor to process the state estimate of the robot.

Interfacing directly with the robot through a port typically used for the hardwired connection and replicating the data typically carried down the hardwired connection for the purposes of effecting desired robot control.

Providing a multi-sensor and sensor-agnostic world map of features stored and managed as potential fields of defined characterizations. The generating of situational awareness maps may include any one or more of the following aspects:

Ingesting video data through a device-specific driver.

Converting video data from a device-specific format to a common image format.

Classifying objects within the image using a provided classifier with a provided object library.

Providing classified objects found in the video image with a standard characterization message on the network.

Ingesting sonar data through a device-specific driver.

Converting sonar data from a device-specific data format to a common image format.

Classifying objects within the image using a provided classifier with a provided object library.

Providing classified objects found in the sonar image with a standard characterization message on the network.

Map object pulls network characterization messages from the network and correlates observations of features through a stochastic weighting of observation characteristics.

Features are stored as probabilities that a feature with certain characteristics exists at a particular location whose field is defined by the uncertainty in the localization of the observation.

The stored feature map requires minimum system resources to store and transmit as it distills high-density perception data of the environment into probabilistic descriptions of the local environment.

The potential field feature map accepts any perception observation.

Providing sensor-agnostic feature-relative control and positioning of the underwater robot.

Managing a tether model by which it can estimate the optimal amount of umbilical to have in the water for tethered applications. This feature allows the optional use of a robot with an umbilical and a "smart topside" configuration where the edge processing is at the top end of the tether vs on the robot itself.

Allowing long distance-including sea-floor to over-the-horizon-communications with a robot remote from its supervisor(s) over any given link and protocol or assemblies of links and protocols.

In some embodiments, a remotely supervised robot (e.g., ROV) system of the present disclosure may comprise two terminus endpoints and any number of communications bridge nodes between the endpoints. One terminus endpoint is contained in the local awareness/autonomy node and another endpoint resides with a supervisor console at a remote station.

In some embodiments, communications bridge nodes exist between the two endpoints wherever there is a change in protocol. Examples include: acoustic communications to radio (e.g., cellular, satellite, etc.) communications, radio communications to WI-FI® communications, among others.

In some embodiments, a remotely supervised robot system of the present disclosure allows communication between one or more remote supervisors and a deployed underwater robot by sensing bandwidth (or using a bandwidth-usage rule), prioritizing data based on the task being performed, compressing data, splitting data into multiple streams that can be handled by the hardware protocol layer natively, and then synchronizing data during reassembly for the supervisor or remote system receiver.

Example Benefits

In some embodiments, apparatuses, methods, and systems of the present disclosure allow traditionally cabled underwater robots to be wireless with no change to the robots' native control systems or loss of performance in the underwater systems. Some embodiments utilize one or more processors housed in a water-proof pressure-proof housing with connectors for connecting perception sensors such as cameras and sonars, a navigation system, and an acoustic modem. Some embodiments employ a behavior-based autonomy engine to execute tasks directed by a supervisor and a potential field-based feature map to maintain situational awareness in the environment without the need to store or communicate large amounts of perception data. Some embodiments employ acoustic communications links and other ad hoc communication methods to manage data between the supervisor and the robot effectively. In some embodiments, the apparatuses, methods, and systems are agnostic to robot types, sensor types, and communication protocols by employing a common data handling framework on a software layer.

In some embodiments, a system of the present disclosure may be a modular and hardware-agnostic local processing system capable of fitting to any underwater robot and enabling the effective remote supervision of underwater robots from anywhere in the world.

In some embodiments, a system of the present disclosure enables the conversion of a hardwired underwater robot to a wireless underwater robot while maintaining operational performance.

In some embodiments, a system of the present disclosure may comprise a local awareness/autonomy node on the robot as well as bridge-processing nodes located at the terminus of a communications protocol used for connecting to the robot. The local awareness/autonomy node typically includes multiple computer processors (scalable based on the complexity of the robot) and a networking switch housed in a waterproof and pressure-tolerant assembly that connects to a host robot and provides connections for a video camera, imaging sonar, navigation sensors, an acoustic modem, and other payloads. Specialized software runs in the processing nodes to allow bandwidth-independent communications with the robot while ensuring the robot can accomplish assigned tasks effectively and under the supervision of human supervisors anywhere in the world.

In some embodiments, the bridge-processing and bridge-terminus nodes may each include a single computer processor and a networking switch. These nodes may be, for example, housed, as appropriate for the operating conditions, in waterproof or standard industrial enclosures having, for example, two standard Ethernet connectors. The bridge-processing node facilitates the union of two communication protocols or the terminus of a single communication protocol so that a supervisor, or network of supervisors, may connect to the system.

The appended claims form part of this disclosure as if presented in this Detailed Description section. The appended claims are a small set of claims that illustrate some of the aspects of the present disclosure, and it is to be understood that many more claims to many more inventions can be made.

Methods disclosed herein can be performed by suitable computer-executable instructions executed by any number of computing devices (e.g., general processing units, application-specific integrated circuits, programmable processors, etc., and any combination thereof) that are well-known in the art. Suitable hardware for executing any of the features of the present disclosure is ubiquitous and can take any of a wide variety of forms. Any computer-executable instructions may be stored in any suitable hardware memory, including combinations of differing types of hardware memories. For convenience and in accordance with convention, such memory is referred to in the appended claims as "computer-readable hardware medium", regardless of the number and/or type(s) of such memory. It is noted that "computer-readable hardware medium" excludes all transient medium/media, including signals encoded on one or more carrier waves or pulses of energy.

In some aspects, the present disclosure is directed to a remotely operated vehicle (ROV) system, that includes an ROV; and a local awareness/autonomy node in operative communication with the ROV, wherein the local awareness/autonomy node allows a remote operator to operate the ROV to perform a task over a communications network containing at least one sparse datalink and having a remote operator side and an ROV side, the local awareness/autonomy node including: memory containing machine-executable instructions for performing a method of operating the ROV to perform the task over the communications network, the method comprising: receiving, on the ROV side of the communications network, a remote supervisory command over the communications network from the remote operator side of the communications network, wherein the remote supervisory command is a command for the ROV to perform the task; receiving awareness data from the ROV; maintaining, on the ROV side of the communications network, awareness information based on the awareness data; and controlling, on the ROV side of the communications network, operations of the ROV as a function of the remote supervisory command and the awareness information so that the ROV performs the task; one or more communications ports interfacing with systems aboard the ROV; one or more microprocessors: in operative communication with the memory; in operative communication with the one or more communications ports; and configured to execute the machine-executable instructions so as to control the ROV to perform the task in response to the remote supervisory command.

In one or more embodiments of the system, receiving awareness data includes receiving at least one of video data, sonar data, and navigation data.

In one or more embodiments of the system, the method further comprises transmitting at least some of the awareness information to the remote operator side of the communications network for display to an operator on an ROV-supervisor station.

In one or more embodiments of the system, the ROV will perform the task in a situational environment, and maintaining awareness information includes maintaining a feature map of the situational environment using the awareness data.

In one or more embodiments of the system, maintaining a feature map includes classifying objects in the situational environment.

In one or more embodiments of the system, the awareness data comprises video data and sonar data.

In one or more embodiments of the system, controlling operations of the ROV include using an autonomy model on the ROV side of the communications network that is configured to control the ROV to perform the task.

In one or more embodiments of the system, the autonomy model contains control commands that control operations of one or more systems onboard the ROV to perform the task in response to receiving the remote supervisory command for the task.

In one or more embodiments of the system, the autonomy model includes a behavior tree.

In one or more embodiments of the system, at least one sparse datalink includes an acoustic datalink.

In one or more embodiments of the system, the local awareness/autonomy node is located aboard the ROV.

In one or more embodiments of the system, the local awareness/autonomy node is located offboard the ROV.

In some aspects, the present disclosure is directed to a remotely operated vehicle (ROV) system, which includes an ROV-supervisor station for receiving input from an ROV supervisor; an ROV that performs a task in response to a remote supervisory command initiated by the ROV supervisor via the ROV-supervisor station; a sparse datalink located between the ROV-supervisor station and the ROV; and a local-awareness node located downstream of the sparse datalink, wherein the local-awareness node is configured to: receive the remote supervisory command from the ROV-supervisor station via the sparse datalink; receive awareness data from the ROV and maintain awareness information based on the awareness data; and control operations of the ROV as a function of the remote supervisory command and the awareness information so that the ROV performs the task.

In one or more embodiments of the system, the local-awareness node is located aboard the ROV.

In one or more embodiments of the system, the ROV is an untethered ROV.

In one or more embodiments of the system, the local-awareness node is located aboard a surface platform and the ROV is tethered to the surface platform.

In one or more embodiments of the system, the ROV is a standard ROV and the local-awareness node comprises a plug-and-play hardware-agnostic node.

In one or more embodiments of the system, a non-acoustic datalink that includes a communications bridge/terminus at one end of the non-acoustic datalink and a communications bridge located at another end of the non-acoustic datalink.

In one or more embodiments of the system, the sparse datalink comprises an acoustic communications link.

In one or more embodiments of the system, the sparse datalink comprises a radio link.

In some aspects, the present disclosure is directed to a kit for using a standard remotely operated vehicle (ROV) in a network comprising a sparse datalink and at least one ROV-supervisor station at a side of the sparse datalink opposite the ROV during operation, wherein each ROV-supervisor station receives input from an ROV supervisor and, during use, the ROV performs a task in response to a remote supervisory command initiated by the ROV supervisor via the ROV-supervisor station. The kit includes a local-awareness node for installation into the network downstream of the sparse datalink, the local-awareness node being configured to, during use: receive the remote supervisory command from the ROV-supervisor station via the sparse datalink; receive awareness data from the ROV and maintain awareness information based on the awareness data; and control operations of the ROV as a function of the remote supervisory command and the awareness information so that the ROV performs the task.

In one or more embodiments of the system, the local-awareness node comprises a plug-and-play hardware-agnostic node.

In one or more embodiments of the system, the ROV is a tetherless ROV, and the local-awareness node is configured to be located aboard the tetherless ROV.

In one or more embodiments of the system, the ROV is a tethered ROV operable from a platform, wherein the local-awareness node is configured to be located aboard the platform.

In one or more embodiments of the system, the network comprise at least one non-acoustic datalink and the kit further comprises a communications bridge/terminus for locating at one end of the non-acoustic datalink and a communications bridge for locating at another end of the non-acoustic datalink.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A method of operating a remotely operated vehicle (ROV) to perform a task over a communications network containing at least one sparse datalink, wherein the communications network has a remote operator side and an ROV side, wherein the at least one sparse datalink has at least one of (i) a bandwidth that is narrower than the bandwidth needed for a remote operator to supervise the ROV so that the ROV successfully performs the task and (ii) a latency that is higher than the maximum latency tolerable for the ROV to successfully perform the task, the method comprising:

receiving, on the ROV side of the communications network, a remote supervisory command over the communications network from the remote operator side of the communications network, wherein the remote supervisory command is a command for the ROV to perform the task, and wherein the remote supervisory command is a high-level objective-based instruction requiring context of task, purpose, and desired state;

receiving awareness data from the ROV;

maintaining, on the ROV side of the communications network, awareness information based on the awareness data, wherein maintaining the awareness information includes maintaining a feature map of a situational environment of the ROV using the awareness data; and controlling, on the ROV side of the communications network, operations of the ROV as a function of the remote supervisory command and the awareness information so that the ROV performs the task, wherein controlling operations of the ROV includes, on the ROV side of the communications network and downstream of the at least one sparse datalink, using an autonomy model configured to control the ROV to perform the task based on the remote supervisory command and the feature map, wherein the autonomy model contains control commands that control operations of one or more systems onboard the ROV to perform the task in response to the remote supervisory command, and wherein all loop closures for controlling the ROV to perform the task are done on an edge-computing node local to the ROV.

2. The method of claim 1, wherein receiving awareness data includes receiving at least one of video data, sonar data, and navigation data.

3. The method of claim 1, further comprising transmitting at least some of the awareness information to the remote operator side of the communications network for display to an operator on an ROV-supervisor station.

4. The method of claim 1, wherein the ROV will perform the task in a situational environment, and maintaining awareness information includes maintaining a classified potential-filed feature map of the situational environment using the awareness data.

5. The method of claim 4, wherein maintaining a feature map includes classifying objects in the situational environment.

6. The method of claim 4, wherein the awareness data comprises video data and sonar data.

7. The method of claim 1, wherein the autonomy model is implemented using a behavior tree or a state machine.

8. The method of claim 7, wherein the autonomy model contains control commands that control operations of one or more systems onboard the ROV to perform the task in response to receiving the remote supervisory command for the task.

9. The method of claim 7, wherein the autonomy model includes a behavior tree.

10. The method of claim 1, wherein the at least one sparse datalink includes an acoustic datalink.

11. A non-transitory machine-readable storage medium containing machine-executable instructions for performing a method of operating a remotely operated vehicle (ROV) to perform a task over a communications network containing at least one sparse datalink, wherein the at least one sparse datalink has at least one of 1) a bandwidth that is narrower than the bandwidth needed for one or more remote operators to supervise the ROV so that it successfully performs the task and 2) a latency that is higher than the maximum latency tolerable for being able to successfully perform the task, and wherein the communications network has a remote operator side and an ROV side, the method comprising:

receiving, on the ROV side of the communications network, a remote supervisory command over the communications network from the remote operator side of the communications network, wherein the remote supervisory command is a high-level objective-based instruction requiring context of task, purpose, and desired end state and is a command for the ROV to perform the task;

receiving awareness data from the ROV;

maintaining, on the ROV side of the communications network, awareness information based on the awareness data, wherein maintaining the awareness information includes maintaining a feature map of a situational environment of the ROV using the awareness data; and controlling, on the ROV side of the communications network, operations of the ROV as a function of the remote supervisory command and the awareness information so that the ROV performs the task, including, on the ROV side of the communications network and downstream of the at least one sparse datalink, using an autonomy model on an edge-computing node local to the ROV that is configured to control the ROV to perform the task based on the remote supervisory command and the feature map, wherein the autonomy model contains control commands that control operations of one or more systems onboard the ROV to perform the task in response to receiving the remote supervisory command for the task, and wherein all loop closures for controlling the ROV to perform the task are done on the edge-computing node local to the ROV.

12. The non-transitory machine-readable storage medium of claim 11, wherein receiving awareness data includes receiving at least one of video data, sonar data, and navigation data.

13. The non-transitory machine-readable storage medium of claim 11, wherein the method further comprises transmitting at least some of the awareness information to the remote operator side of the communications network for display to an operator on an ROV-supervisor station.

14. The non-transitory machine-readable storage medium of claim 11, wherein the ROV will perform the task in a situational environment, and maintaining awareness information includes maintaining a classified potential-field feature map of the situational environment using the awareness data.

15. The non-transitory machine-readable storage medium of claim 14, wherein maintaining a feature map includes classifying objects in the situational environment.

16. The non-transitory machine-readable storage medium of claim 14, wherein the awareness data comprises video data and sonar data.

17. The non-transitory machine-readable storage medium of claim 11, wherein the autonomy model is implemented using a behavior tree or a state machine.

18. The non-transitory machine-readable storage medium of claim 17, wherein the autonomy model contains control commands that control operations of one or more systems onboard the ROV to perform the task in response to receiving the remote supervisory command for the task via ROV-interface algorithms for interfacing with an ROV controller.

19. The non-transitory machine-readable storage medium of claim 17, wherein the autonomy model includes a behavior tree.

20. The non-transitory machine-readable storage medium of claim 11, wherein the at least one sparse datalink includes an acoustic datalink.

21. A local awareness/autonomy node for a remotely operated vehicle (ROV), wherein the local awareness/autonomy node allows a remote operator to operate the ROV to perform a task over a communications network containing at least one sparse datalink and having a remote operator side and an ROV side, wherein the at least one sparse datalink has at least one of 1) a bandwidth that is narrower than the bandwidth needed for one or more remote operators to supervise the ROV so that it successfully performs the task and 2) a latency that is higher than the maximum latency tolerable for being able to successfully perform the task, the local awareness/autonomy node comprising:

memory containing machine-executable instructions for performing a method of operating the ROV to perform the task over the communications network, the method comprising:

receiving, on the ROV side of the communications network, a remote supervisory command over the communications network from the remote operator side of the communications network, wherein the remote supervisory command is a high-level objective-based instruction requiring context of task, purpose, and desired end state and is a command for the ROV to perform the task;

receiving awareness data from the ROV;

maintaining, on the ROV side of the communications network, awareness information based on the awareness data, wherein maintaining the awareness information includes maintaining a feature map of a situational environment of the ROV using the awareness data; and controlling, on the ROV side of the communications network, operations of the ROV as a function of the remote supervisory command and the awareness information so that the ROV performs the task, including, on the ROV side of the communications network and downstream of the at least one sparse datalink, using an autonomy model on the local awareness/autonomy node, the local awareness/autonomy node being an edge-computing node local to the ROV, that is configured to control the ROV to perform the task based on the remote supervisory command and the feature map, wherein the autonomy model contains control commands that control operations of one or more systems onboard the ROV to perform the task in response to receiving the remote supervisory command for the task, and wherein all loop closures for controlling the ROV to perform the task are done on the local awareness/autonomy node;

one or more communications ports configured to interface with systems aboard the ROV;

one or more microprocessors:

in operative communication with the memory;

when the local awareness/autonomy node is deployed, in operative communication with the one or more communications ports; and configured to execute the machine-executable instructions so as to control the ROV to perform the task in response to the remote supervisory command.

22. The local awareness/autonomy node of claim 21, wherein receiving awareness data includes receiving at least one of video data, sonar data, and navigation data.

23. The local awareness/autonomy node of claim 21, wherein the method further comprises transmitting at least some of the awareness information to the remote operator side of the communications network for display to an operator on an ROV-supervisor station.

24. The local awareness/autonomy node of claim 21, wherein the ROV will perform the task in a situational environment, and maintaining awareness information includes maintaining a classified potential-field feature map of the situational environment using the awareness data.

25. The local awareness/autonomy node of claim 24, wherein maintaining a feature map includes classifying objects in the situational environment.

26. The local awareness/autonomy node of claim 24, wherein the awareness data comprises video data and sonar data.

27. The local awareness/autonomy node of claim 21, wherein the autonomy model is implemented using a behavior tree or a state machine.

28. The local awareness/autonomy node of claim 27, wherein the autonomy model contains control commands that control operations of one or more systems onboard the ROV to perform the task in response to receiving the remote supervisory command for the task via the one or more communications ports for interfacing with an ROV controller.

29. The local awareness/autonomy node of claim 27, wherein the autonomy model includes a behavior tree.

30. The local awareness/autonomy node of claim 21, wherein the at least one sparse datalink includes an acoustic datalink.

* * * * *